United States Patent
Koo

(10) Patent No.: US 10,116,896 B2
(45) Date of Patent: Oct. 30, 2018

(54) DISPLAY APPARATUS AND CONTROL METHOD THEREOF

(71) Applicant: SAMSUNG ELECTRONICS CO., LTD., Suwon-si (KR)

(72) Inventor: Ja Sung Koo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 15/238,851

(22) Filed: Aug. 17, 2016

(65) Prior Publication Data

US 2017/0187984 A1     Jun. 29, 2017

Related U.S. Application Data

(60) Provisional application No. 62/387,163, filed on Dec. 23, 2015.

(30) Foreign Application Priority Data

Jan. 29, 2016   (KR) ......................... 10-2016-0011884

(51) Int. Cl.
*H04N 7/01* (2006.01)
*H04N 11/20* (2006.01)
(Continued)

(52) U.S. Cl.
CPC ................. *H04N 7/01* (2013.01); *H04N 5/46* (2013.01); *H04N 7/108* (2013.01)

(58) Field of Classification Search
CPC ............ H04N 7/01; H04N 7/108; H04N 7/04; H04N 7/06; H04N 7/0884; H04N 7/10;
(Continued)

(56) References Cited

U.S. PATENT DOCUMENTS 6,415,165 B1 * 7/2002 Ishigami ............... G06F 1/1616
                                                    345/173
6,530,085 B1 * 3/2003 Perlman ............... H04N 5/4401
                                                    348/E5.108
(Continued)

FOREIGN PATENT DOCUMENTS

KR   10-2009-0044222 A   5/2009
KR   10-2013-0024941 A   3/2013

OTHER PUBLICATIONS

Anonymous: "Samsung Series 5 5500 LED TV User Manual", title listed as "Samsung Series 5 5500 User Manual". Samsung Electronics Co., Ltd., BN68-03431A-01, Dec. 31, 2011(Dec. 31, 2011), (pp. 1-19) XP055331938, USA and Canada Retrieved from the Internet: URL:https://www.manualslib.com/download/261424/Samsung-Series-5-5500.html [retrieved on Jan. 3, 2017].
(Continued)

*Primary Examiner* — Paulos M Natnael
(74) *Attorney, Agent, or Firm* — Sughrue Mion, PLLC

(57) ABSTRACT

A display apparatus includes a first signal transmission device provided with a first video cable configured to selectively transmit a first image signal transmitted by a first method and a second image signal transmitted by a second method, an audio cable configured to transmit a sound signal, and a first output connector connected to the first video cable and the audio cable; a second signal transmission device provided with a second video cable configured to transmit a third image signal transmitted by the second method, and a second output connector connected to the second video cable.

19 Claims, 42 Drawing Sheets

(51) Int. Cl.
*H04N 7/10* (2006.01)
*H04N 5/46* (2006.01)

(58) Field of Classification Search
CPC ........ H04N 5/46; H04N 5/63; H04N 5/23254; H04N 5/7416; H04N 1/00129; H04N 1/00283; H04N 1/32363; H04N 1/00907; H04N 1/0685; H04N 1/00124; H04N 2005/44573; H04N 2201/0049; H04N 2201/0034; H04N 2201/0044; H04N 3/27; G09G 5/005; H04H 20/78; H04H 20/76
USPC ......... 348/441, 423.1, 429.1, 450, 455, 462, 348/472, 515, 555, 702, 705, 393.1, 234, 348/69, 14.04, 14.07, 706, 714, 719, 725, 348/739, 385.1; 439/14, 39, 59, 63, 89, 439/581, 582, 98, 394, 494, 498, 578, 439/580

See application file for complete search history.

(56) References Cited

U.S. PATENT DOCUMENTS

| | | | | |
|---|---|---|---|---|
| 6,753,917 | B2* | 6/2004 | Tanizoe | H04N 5/23293 348/234 |
| 6,829,779 | B1* | 12/2004 | Perlman | H04N 5/4401 348/E5.108 |
| 6,907,615 | B1* | 6/2005 | Alexander | H04N 5/765 348/E5.108 |
| 7,242,844 | B1 | 7/2007 | Ueno | |
| 7,283,178 | B2* | 10/2007 | Dahlseid | H04N 21/42607 348/552 |
| 7,626,636 | B2* | 12/2009 | Suzuki | H04N 5/46 348/558 |
| 7,683,974 | B2* | 3/2010 | Sun | H01R 27/02 348/705 |
| 7,792,505 | B2* | 9/2010 | Mueller | H03G 3/3042 455/126 |
| 8,710,370 | B2* | 4/2014 | Heo | H01R 24/58 174/113 R |
| 8,793,407 | B2* | 7/2014 | Jeon | G09G 5/006 345/205 |
| 9,183,805 | B2* | 11/2015 | Imai | G09G 3/2096 |
| 2003/0046713 | A1* | 3/2003 | Bontempi | H04N 5/4401 725/151 |
| 2004/0015990 | A1* | 1/2004 | Suematsu | H04B 1/005 725/62 |
| 2004/0017509 | A1* | 1/2004 | Kondo | H04N 11/146 348/453 |
| 2005/0172322 | A1* | 8/2005 | Howard | H04N 21/43615 725/81 |
| 2005/0231591 | A1* | 10/2005 | Abe | G09G 5/006 348/65 |
| 2006/0203133 | A1 | 9/2006 | Fujiwara | |
| 2007/0153132 | A1* | 7/2007 | Jong | H04N 5/775 348/705 |
| 2007/0180443 | A1* | 8/2007 | Kondo | H04N 5/4401 717/168 |
| 2008/0012995 | A1* | 1/2008 | Higashi | H04N 5/4401 348/739 |
| 2008/0062328 | A1* | 3/2008 | Bilbrey | H04N 5/765 348/705 |
| 2008/0291334 | A1 | 11/2008 | Baek | |
| 2009/0052144 | A1* | 2/2009 | Martich | H01R 4/2416 361/728 |
| 2009/0109335 | A1 | 4/2009 | Choi et al. | |
| 2010/0053471 | A1* | 3/2010 | Shikata | H04N 5/60 348/738 |
| 2010/0194765 | A1* | 8/2010 | Nakamura | G06F 3/14 345/520 |
| 2010/0230159 | A1 | 9/2010 | Heo | |
| 2010/0254025 | A1* | 10/2010 | Yoshida | G02B 9/60 359/717 |
| 2010/0289958 | A1* | 11/2010 | Iyer | H04S 7/00 348/555 |
| 2011/0012546 | A1* | 1/2011 | Rui | G06F 1/266 318/400.27 |
| 2011/0032433 | A1* | 2/2011 | Sato | G09G 5/006 348/705 |
| 2012/0133829 | A1* | 5/2012 | Nakade | H04N 5/04 348/515 |
| 2013/0232367 | A1* | 9/2013 | Matsumura | G06F 1/3234 713/324 |
| 2013/0262464 | A1* | 10/2013 | Klane | G06F 17/30312 707/736 |
| 2014/0015873 | A1* | 1/2014 | Kasai | G09G 3/36 345/698 |
| 2014/0026177 | A1* | 1/2014 | Hashiguchi | H04N 21/6156 725/129 |
| 2014/0125756 | A1* | 5/2014 | Hsu | G09G 3/2096 348/14.04 |
| 2015/0103133 | A1* | 4/2015 | Epstein | H04N 5/268 348/14.07 |
| 2015/0310794 | A1 | 10/2015 | Gille et al. | |

OTHER PUBLICATIONS

Anonymous: "Amazon: 3.5mm Male Plug to 3 RCA Female Audio Video AV Cable", Jan. 17, 2014(Jan. 17, 2014), (pp. 1-3), XP055331951 Retrieved from the Internet: URL:https://www.amazon.co.uk/3-5mm-Female-Audio-Video-Cable/dp/B00GN78J3Y.
Anonymous: "Amazon: 3.5mm Stereo Male Plug to 2 RCA Female Jack Splitter Adapter Y Cable", May 4, 2015(May 4, 2015), XP055331949, (4 Pages Total) Retrieved from the Internet: URL:https://www.amazon.com/dp/B00X3N9HYQ?psc=1.
Communication dated Jan. 12, 2017, issued by the European Patent Office in counterpart European Application No. 16182503.9.
International Search Report dated Jan. 5, 2017 (PCT/ISA/210), issued by International Searching Authority in counterpart International Application No. PCT/KR2016/010923.

* cited by examiner

FIG.14

| FIRST SIGNAL TRANSMISSION DEVICE | SECOND SIGNAL TRANSMISSION DEVICE | FIRST MODE | SECOND MODE |
|---|---|---|---|
| 0 | 0 | DEACTIVATION | DEACTIVATION |
| 1 | 0 | ACTIVATION | DEACTIVATION |
| 0 | 1 | DEACTIVATION | DEACTIVATION |
| 1 | 1 | DEACTIVATION | ACTIVATION |

DISPLAY APPARATUS AND CONTROL METHOD THEREOF

CROSS-REFERENCE TO RELATED APPLICATIONS

This application claims priority from Korean Patent Application No. 10-2016-0011884, filed on Jan. 29, 2016 in the Korean Intellectual Property Office, and the benefit of U.S. Provisional Application No. 62/387,163, filed on Dec. 23, 2015, the disclosures of which are incorporated herein by reference in their entireties.

BACKGROUND

1. Field

Apparatuses and methods consistent with exemplary embodiments relate to a display apparatus connected to an external device via a signal transmission device, and a control method thereof.

2. Description of the Related Art

A display apparatus, e.g., a television (TV), is typically used to view a terrestrial broadcast by receiving a broadcast signal that is transmitted from a broadcast station via an antenna.

However, display apparatuses may also receive an image signal or a sound signal by being connected to an external device and process the received image signal and sound signal to output them and provide a variety of contents to a user.

Because the format of the signal transmitted may vary according to the type of the external device connected to the display device, a particular cable may be necessary for the external device which is intended to be connected.

SUMMARY

Exemplary embodiments may address at least the above problems and/or disadvantages and other disadvantages not described above. Also, the exemplary embodiments are not required to overcome the disadvantages described above, and may not overcome any of the problems described above.

Exemplary embodiments provide a display apparatus capable of converting into a mode corresponding to an input signal by combining two cables transmitting an image signal in different methods and by automatically determining which method of the image signal to be input, and a control method thereof.

Additional aspects will be set forth in part in the description which follows and, in part, will be obvious from the description, or may be learned by practice of the exemplary embodiments.

According to an aspect of an exemplary embodiment, there is provided a display apparatus including a first signal transmission device including: a first video cable configured to selectively transmit a first image signal transmitted by a first method and a second image signal transmitted by a second method; an audio cable configured to transmit a sound signal; and a first output connector connected to the first video cable and the audio cable; a second signal transmission device including: a second video cable configured to transmit a third image signal transmitted by the second method; and a second output connector connected to the second video cable; a receiver including a first input terminal to which the first output connector is configured to be connected, and a second input terminal to which the second output connector is configured to be connected; and a controller configured to determine an image output mode based on whether the first output connector is connected to the first input terminal and whether the second output connector is connected to the second input terminal.

The first image signal may be a composite signal and the second image signal may be a component signal among a plurality of component signals, wherein the image output mode may include a first mode to output a composite image by processing the composite signal, and a second mode to output a component image by processing the plurality of component signals.

The controller may be further configured to, in response to the first input terminal being connected to the first output connector and the second input terminal not being connected to the second output connector, determine the image output mode as the first mode.

The controller may be further configured to, in response to the first input terminal being connected to the first output connector and the second input terminal being connected to the second output connector, determine the image output mode as the second mode.

The controller may be further configured to, in response to the first input terminal not being connected to the first output connector and the second input terminal being connected to the second output connector, determine the image output mode as a third mode.

The controller may be further configured to convert the image output mode automatically according to the determined image output mode.

The display apparatus may further include a body; and a display provided in a front surface of the body, wherein the first input terminal and the second input terminal are disposed in a rear surface of the body.

The first output connector may be configured to be inserted into the first input terminal in a direction parallel to a plane surface of the display, and the second output connector may be configured to be inserted into the second input terminal in a direction parallel to the plane surface of the display.

The display may be configured to, in response to the second output connector being connected to the second input terminal and the first output connector not being connected to the first input terminal, display a screen to guide a connection between the first output connector and the first input terminal.

The first signal transmission device may further include: a first image input connector configured to connect a first external device that outputs a composite signal or a second external device that outputs a component signal to the first video cable; and a sound input connector configured to connect the first external device or the second external device to the audio cable, and wherein the second signal transmission device may further include a second image input connector configured to connect the second external device to the second video cable.

The display apparatus may further include a display configured to, in response to the first output connector being connected to the first input terminal and the second output connector not being connected to the second input terminal, display a screen to guide a connection between the first image input connector, the sound input connector, and the first external device.

The display may be configured to, in response to the first output connector being connected to the first input terminal and the second output connector being connected to the second input terminal, display a screen to guide a connection between the first image input connector, the sound input connector, the second image input connector, and the second external device.

According to an aspect of another exemplary embodiment, there is provided a display apparatus including a first signal transmission device including: a first video cable configured to selectively transmit a first component signal among a plurality of component signals and a composite signal; an audio cable configured to transmit a sound signal; a first output connector connected to the first video cable and the audio cable; and a first input connector connected to a first external device that outputs a composite signal or a second external device that outputs a plurality of component signals via an external cable; a second signal transmission device including: a second video cable configured to transmit a second component signal among the plurality of component signals, a third video cable configured to transmit a third component signal among the plurality of component signals; a second output connector connected to the second video cable and the third video cable; and a second input connector connected to a second external device that outputs the plurality of component signals via an external cable; and a receiver including a first input terminal to which the first output connector is configured to be connected, and a second input terminal to which the second output connector is configured to be connected.

The first input connector may include a first image input connector connected to the first video cable and a sound input connector connected to the audio cable, and the second input connector may include a second image input connector connected to the second video cable and a third input connector connected to the third video cable, wherein the first image input connector, the sound input connector, the second image input connector, and the third image input connector are female connectors.

The first video cable may have a different length than the audio cable and the second video cable may have a different length than the third video cable.

According to an aspect of another exemplary embodiment, there is provided a control method of a display apparatus including: determining whether a first signal transmission device is connected to a first input terminal, wherein the first signal transmission device includes a first video cable for selectively transmitting a first component signal and a composite signal, an audio cable for transmitting a sound signal, and a first output connector connected to the first video cable and the audio cable; determining whether a second signal transmission device is connected to a second input terminal, wherein the second signal transmission device includes a second video cable for transmitting a second component signal, a third video cable for transmitting a third component signal, and a single second output connector connected to the second video cable and the third video cable; and determining an image output mode based whether there is a connection between the first output connector and the first input terminal and whether there is a connection between the second output connector and the second input terminal.

The determining the image output mode may include, in response to the first input terminal being connected to the first signal transmission device and the second input terminal not being connected to the second signal transmission device, determining the image output mode as a first mode outputting a composite image by processing the composite signal.

The determining the image output mode may include, in response to the first input terminal being connected to the first signal transmission device and the second input terminal being connected to the second signal transmission device, determining the image output mode as a second mode outputting a component image by processing the component signal.

The determining the image output mode may include, in response to the first input terminal not being connected to the first signal transmission device and the second input terminal being connected to the second signal transmission device, determining the image output mode as a third mode.

The control method may include converting the image output mode automatically according to the determined image output mode.

According to an aspect of another exemplary embodiment, there is provided a display apparatus including: a receiver including a first input terminal configured to receive a first image signal from a first signal transmission device, and a second input terminal configured to receive a second image signal from a second signal transmission device; and a controller configured to determine an image output mode according to whether a first output connector is connected to the first input terminal and whether a second output connector is connected to the second input terminal.

The controller may be further configured to, in response to the first input terminal being connected and the second input terminal not being connected, determine the image output mode as a first mode.

The controller may be further configured to, in response to the first input terminal being connected and the second input terminal being connected, determine the image output mode as the second mode.

The first image signal may be a composite signal and the second image signal may be a component signal among a plurality of component signals, and wherein the first mode may include outputting a composite image by processing the composite signal, and the second mode may include outputting a component image by processing the plurality of component signals.

The first signal transmission device may be configured to selectively transmit the first image signal by a first method and a third image signal by a second method, and the second signal transmission device may be configured to transmit the second image signal by the second method.

BRIEF DESCRIPTION OF THE DRAWINGS

These and/or other aspects will become apparent and more readily appreciated from the following description of the exemplary embodiments, taken in conjunction with the accompanying drawings of which:

FIG. 14 is a table of an output mode determined by whether a first signal transmission device and a second signal transmission device are connected to a display apparatus or not, according to an exemplary embodiment.

DETAILED DESCRIPTION

Figure 1:
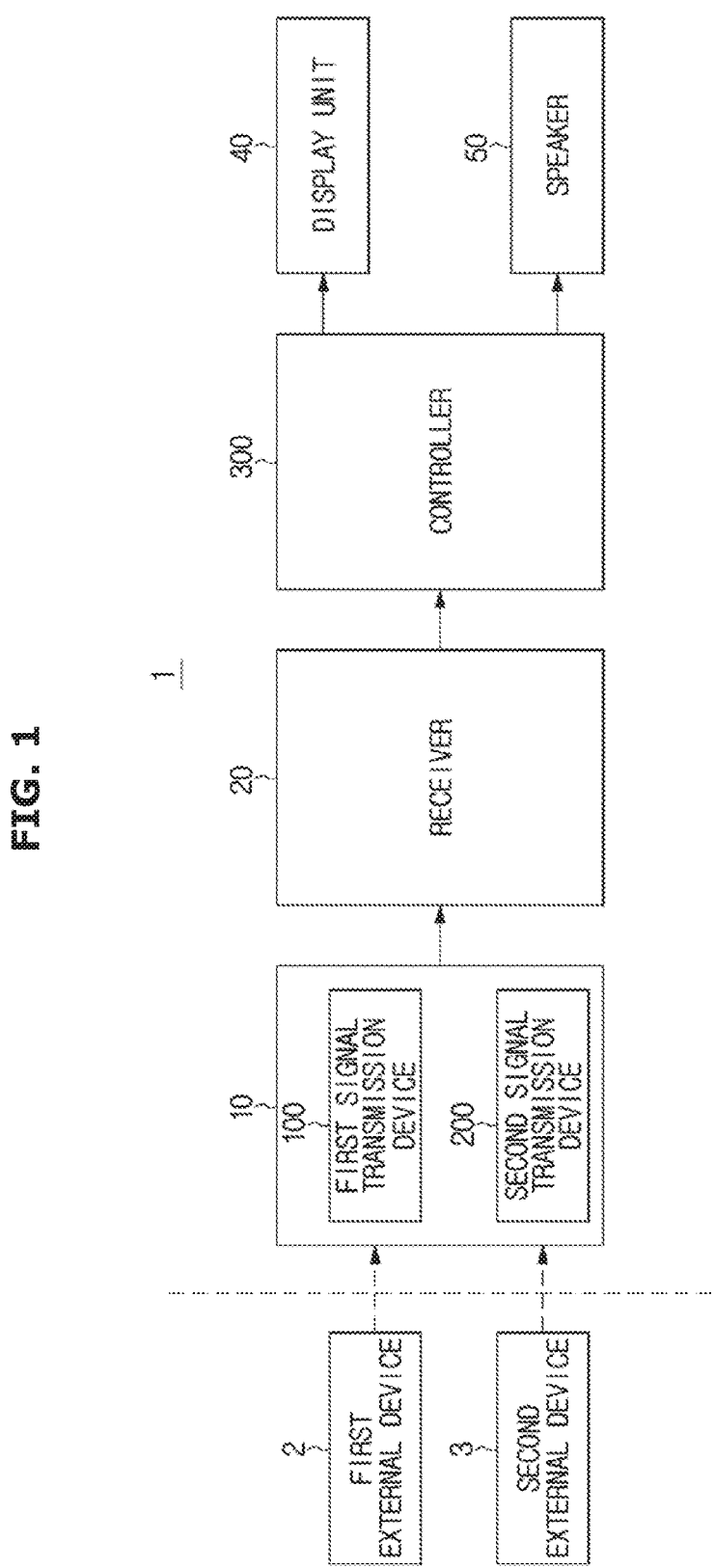
FIG. 1 is a control block diagram of a display apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of one or more exemplary embodiments. Thus, it is apparent that one or more exemplary embodiments can be carried out without those specifically defined matters. Also, well-known functions or constructions may not be described in detail if they would obscure the disclosure with unnecessary detail.

It will be understood that the terms such as "unit," "-er (-or)," and "module" described in the specification refer to an element for performing at least one function or operation, and may be implemented in hardware, software, or the combination of hardware and software.

Expressions such as "at least one of," when preceding a list of elements, modify the entire list of elements and do not modify the individual elements of the list.

According to an exemplary embodiment, an electronic device may receive an image signal and a sound signal from an external device, and may process the received image signal and sound signal, and output the processed image signal and sound signal. For example, an electronic device may be implemented by a display apparatus configured to display a processed image signal, and the display apparatus may be a television (TV). Below, a case in which an electric device is implemented by a display apparatus will be described as an example.

Figure 2:
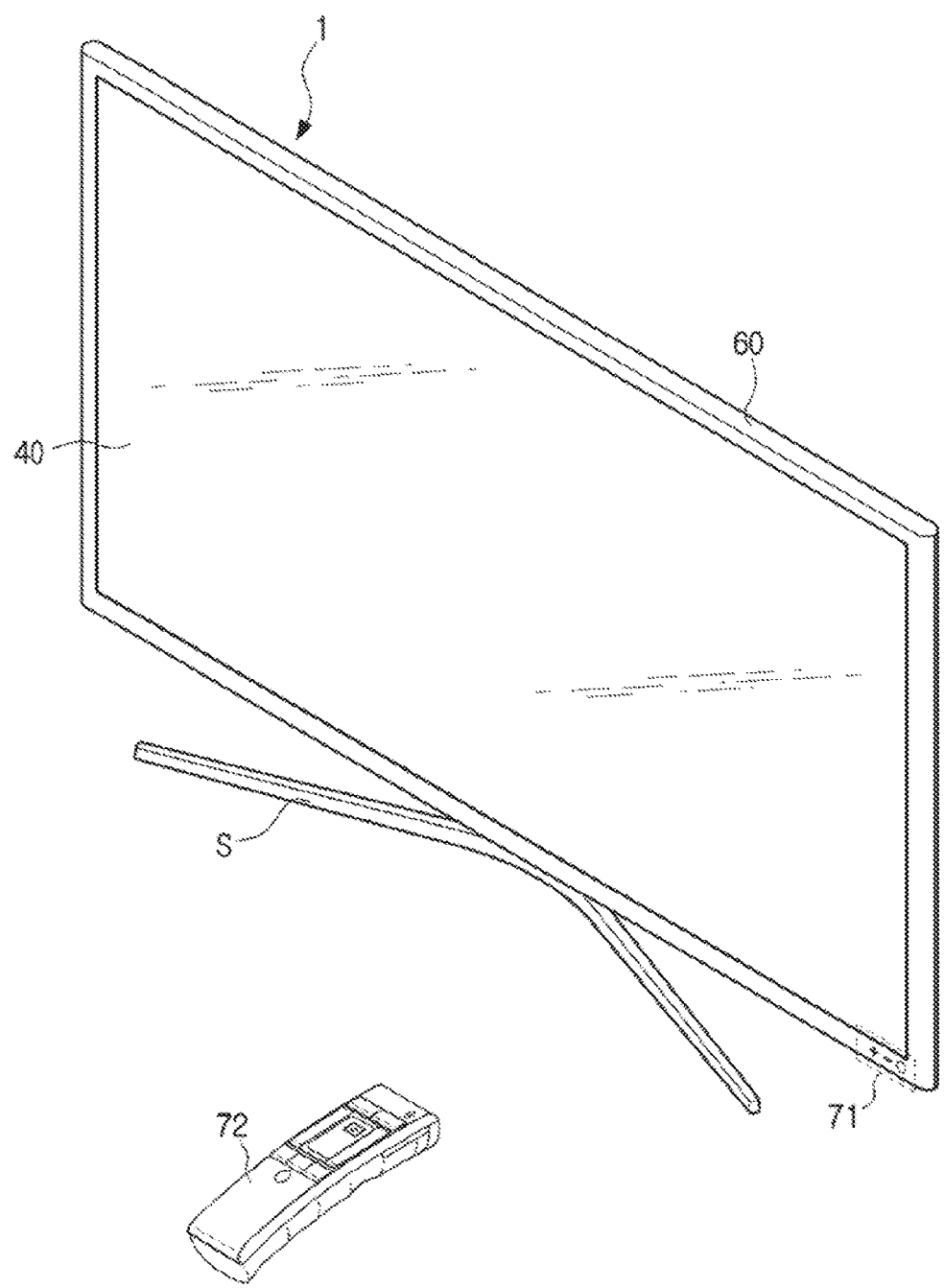
FIGS. 2 to 4 are views of an exterior of a display apparatus according to an exemplary embodiment.
Figure 3:
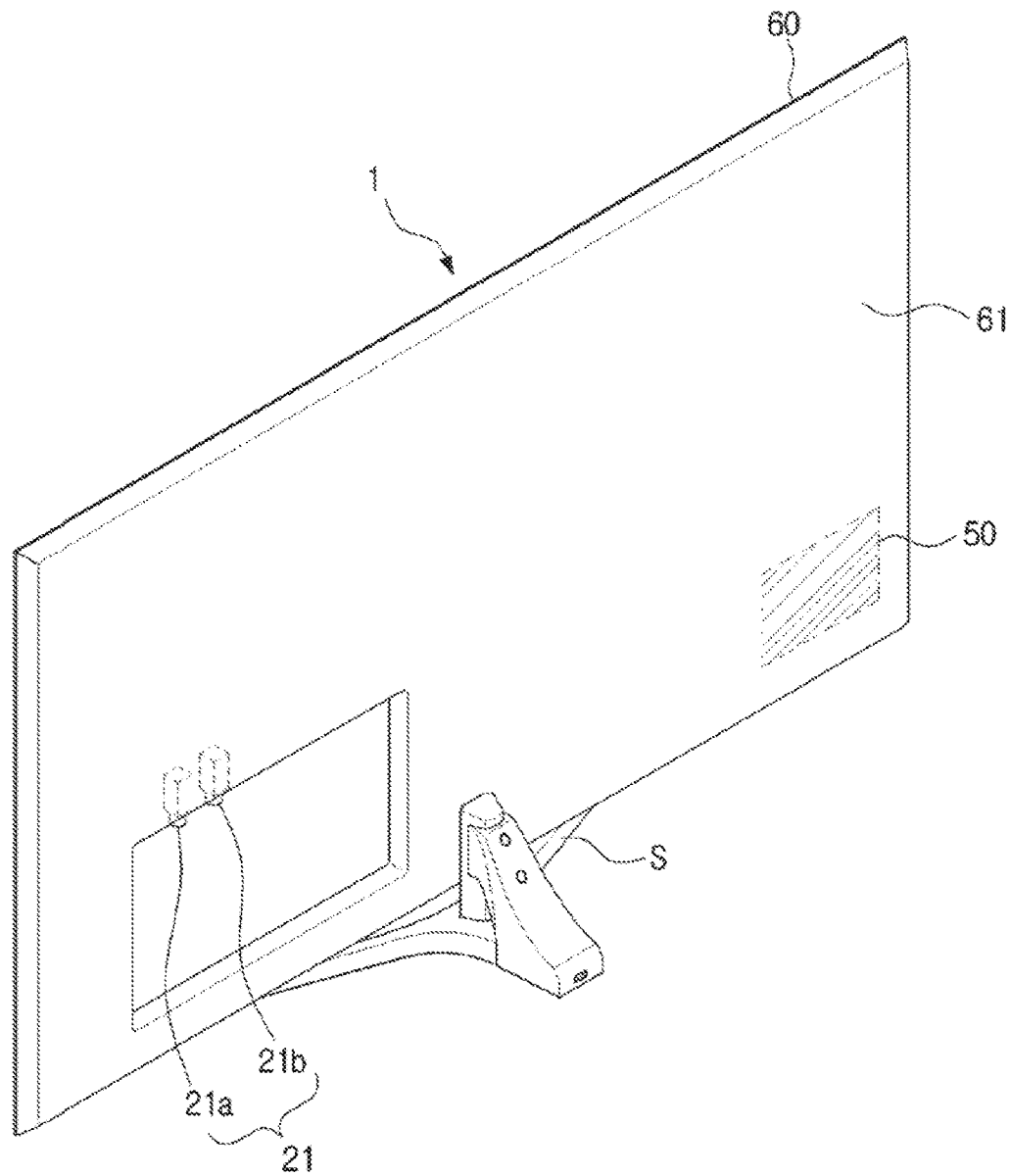
Figure 4:
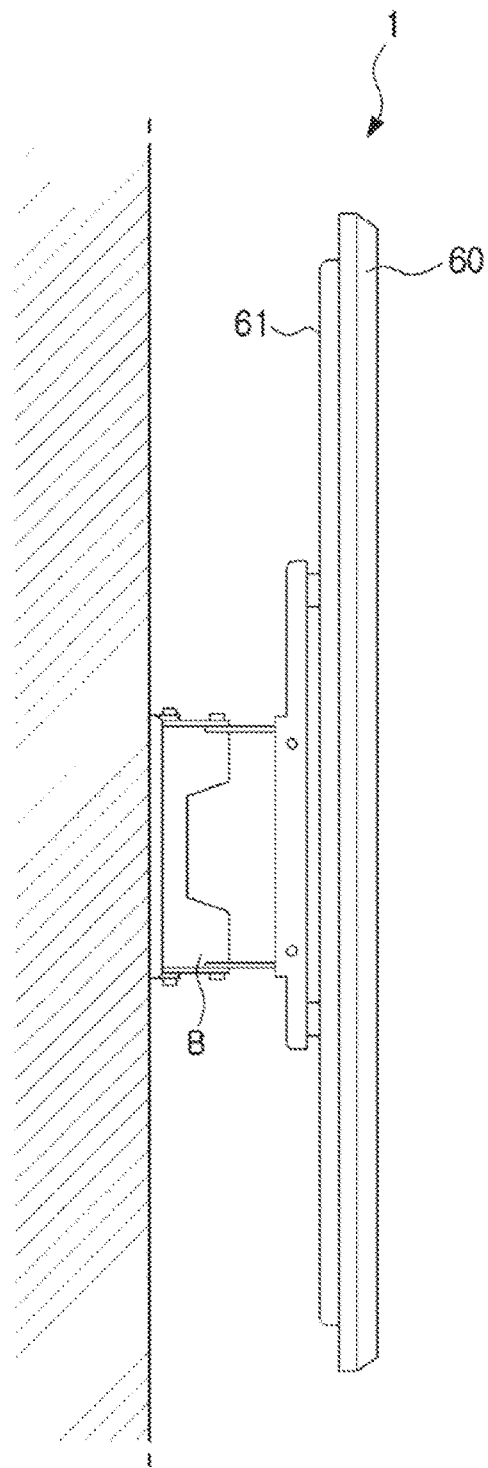

FIG. 1 is a control block diagram of a display apparatus according to an exemplary embodiment, and FIGS. 2 to 4 are views of an exterior of a display apparatus according to an exemplary embodiment.

Referring to FIG. 1, according to an exemplary embodiment, a display apparatus 1 may include a signal transmission device 10 configured to receive an image signal and a sound signal from an external devices 2 and 3 and transmit the image signal and the sound signal to the display apparatus 1 when connected to the external devices 2 and 3, a receiver 20 configured to receive an image signal and a sound signal from the signal transmission device 10, a controller 300 configured to determine an image output mode based on a signal transmitted from the signal transmission device 10, a display unit 40 (e.g., display) configured to display an image, and a speaker 50 configured to output a sound.

The signal transmission device 10 may be detachably provided in the receiver 20, and may include a plurality of signal transmission devices 100 and 200 to transmit an image signal in a plurality of formats that are different from each other.

The format of image signal may vary according to a signal transmission method. For example, if an image signal is transmitted in a component method that is one of an analog image standard, the image signal may be transmitted by being divided into three pieces.

For example, when using YPbPr color space, an image signal may be transmitted by being divided into a luminance signal (Y), a red color difference signal (Pr) indicating the difference between a red color and luminance, and a blue color difference signal (Pb) indicating the difference between a blue color and luminance.

When using RGB color space, the image signal may be transmitted by being divided into a red signal (R), a green signal (G), and a blue signal (B).

When an image signal is transmitted in a composite method, which is another analog image standard, the image signal may be transmitted as a single signal at the same time, without dividing the image signal into a luminance signal and a color signal. A composite image signal may be referred to as Composite Video Blanking and Sync (CVBS) signal.

Below, a case in which the signal transmission device 10 may transmit an image signal in the component method (e.g., component signal) and an image signal in the composite method (e.g., composite signal), which are output from the external devices 2 and 3, to the display apparatus 1 will be described as an example.

Referring to FIG. 2, the display apparatus 1 may include a body 60 forming an exterior of the display apparatus 1 and accommodating and supporting a variety of components forming the display apparatus 1.

The display unit 40 may be disposed on a front surface of the body 60, and a body input unit 71 configured to receive a control command from a user may be formed in at least one portion of the front surface of the body 60.

The display unit 40 may be implemented by various methods, e.g., Cathode Ray Tube (CRT) method, Liquid Crystal Display (LCD) method, Light Emitting Diode (LED) method, Organic Light Emitting Diode) (OLED) method, Plasma Display Panel (PDP) method, and Field Emission Display (FED) method, etc.

The body input unit 71 may be implemented by at least one among a button type, a touch pad type, and a dial and jog shuttle type that is moved by pushing or rotating by a user.

The display apparatus 1 may further include a remote input unit 72 e.g., a remote controller, configured to allow a user, who is in a remote place from the body 60, to input a control command, as well as a body input unit 71 provided in the body 60.

A control command input from a user may include power ON/OFF, volume level adjustment, broadcast channel selection, and adjustment of display characteristics, e.g., a luminance, a brightness, and a chroma.

An input of a selection related to a signal format of a content, which is then output via the display unit 40, that is a selection related to an image output mode, may be received. For example, an input of a selection, which is related to whether an image signal transmitted in the component method is processed and output or an image signal transmitted in the composite method is processed and output, may be received.

For example, when the external device 2 connected to the signal transmission device 10 is a video player, an image signal may be transmitted in the composite method, and when the external device 3 connected to the signal transmission device 10 is a set top box or a DVD player, an image signal may be transmitted in the component method.

An image output mode may include a first mode and a second mode, wherein the first mode may correspond to a composite mode configured to output a composite signal, and the second mode may correspond to a component mode configured to output a component signal. In addition, the image output mode may further include a broadcasting mode configured to process and output a broadcast signal that is radiated from a broadcasting station.

Referring to FIG. 3, the speaker 50 configured to output a sound may be formed in at least one portion of a rear surface of the body 60. However, this is an example. The speaker 50 may be provided in a front surface or a side surface of the display apparatus 1. Therefore there may be no limitation in the position and the number of the speaker 50.

A terminal unit 21 to which the signal transmission device 10 is connected may be formed on the rear surface of the body 60 and the terminal unit 21 may include a first terminal 21a connected to a first signal transmission device 100 and a second terminal 21b connected to a second signal transmission device 200. A detailed relationship between the terminal unit 21 and the signal transmission device 10 will be described below.

As illustrated in FIGS. 2 and 3, the body 60 may be disposed on a horizontal plane by being supported by a stand (S), but it is not limited thereto. Alternatively, as illustrated in FIG. 4, the display apparatus 1 may be implemented in a wall mounting type in which a bracket (B) is connected to the rear surface of the body 60 and the bracket (B) is installed in a wall.

Figure 5:
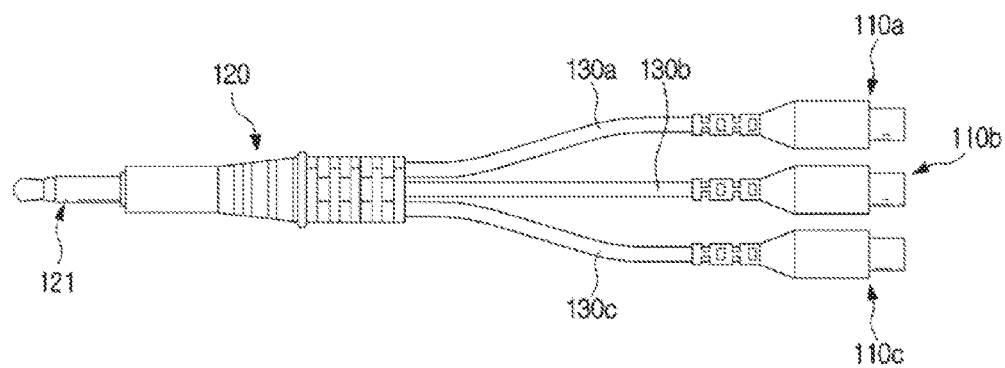
FIGS. 5 and 6 are views of an exterior of a signal transmission device according to an exemplary embodiment.
Figure 6:
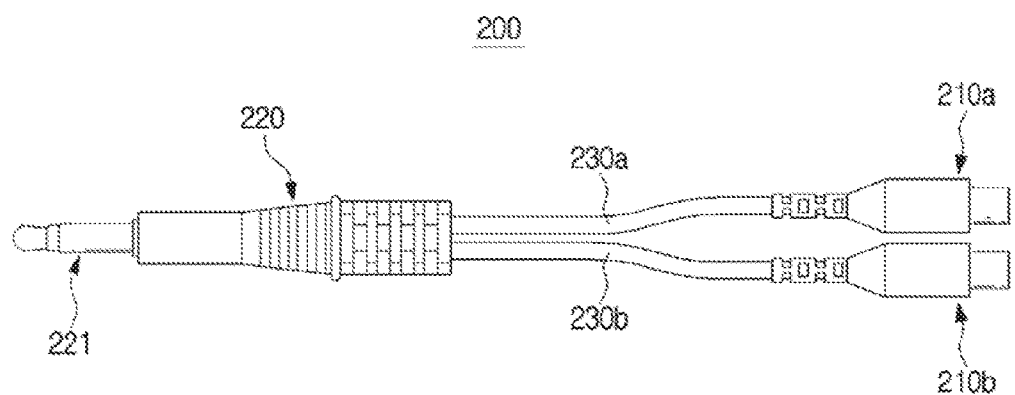

FIGS. 5 and 6 are views of an exterior of a signal transmission device according to an exemplary embodiment.

Referring to FIG. 5, the first signal transmission device 100 may include a plurality of input connectors 110a, 110b, and 110c configured to receive an input of an image signal and a sound signal output from the external devices 2 and 3; a single output connector 120 configured to output the input image signal and sound signal to the display apparatus 1; and a plurality of cables 130a, 130b, and 130c configured to connect the plurality of input connectors 110a, 110b, and 110c to the one output connector 120, respectively.

The plurality of input connectors 110a, 110b, and 110c may be connected to the external devices 2 and 3 outputting an image signal, and the one output connector 120 may be connected to the display apparatus 1.

The plurality of input connectors 110a, 110b, and 110c may include a first image input connector 110a to which an image signal is input, and sound input connectors 110b and 110c to which a sound signal is input.

The first image input connector 110a may receive an input of a first image signal and a second signal in differential formats. For example, a first image signal may be a composite signal and a second image signal may be a component signal among a plurality of component signals.

When the first image input connector 110a is connected to the first external device 2 outputting a composite signal, the composite signal may be input to the first image input connector 110a, and when the first image input connector 110a is connected to the second external device 3 outputting a component signal, a first component signal may be input to the first image input connector 110a.

The sound input connector 110b and 110c may include a left sound input connector 110b and a right sound input connector 110c. When the sound input connectors 110b and 110c is connected to the external devices 2 and 3 to which the first image input connector 110a is connected, a sound signal, which is synchronized with an image signal that is input to the first image input connector 110a, may be input to the sound input connectors 110b and 110c.

The plurality of cables 130a, 130b, and 130c may include a first video cable 130a connecting the first image input connector 110a to the output connector 120; a left audio cable 130b connecting the left sound input connector 110b to the output connector 120; and a right audio cable 130c connecting the right sound input connector 110c to the output connector 120.

The output connector 120 may be connected to the plurality of input connectors 110a, 110b, and 110c via the plurality of cables 130a, 130b, and 130c, to transmit a plurality of signals input from the external devices 2 and 3 to the display apparatus 1.

The output connector 120 may include an output terminal 121 that is insertable to the first input terminal 21a. When the output terminal 121 of the first signal transmission device 100 is inserted into the first input terminal 21a of the display apparatus 1 and the plurality of input connector 110a, 110b, and 110c is connected to the external devices 2 and 3, the display apparatus 1 and the external devices 2 and 3 may be connected to each other via the first signal transmission device 100.

Referring to FIG. 6, the second signal transmission device 200 may include a plurality of input connectors 210a and 210b configured to receive an input of an image signal output from the second external device 3; a single output connector 220 configured to output the input image signal to the display apparatus 1; and a plurality of cables 230a and 230b configured to connect the plurality of input connectors 210a and 210b to the one output connector 220, respectively.

The plurality of input connectors 210a and 210b may be connected to the second external device 3 outputting a component signal, and the one output connector 220 may be connected to the display apparatus 1.

The plurality of input connectors 210a and 210b may receive an input of a third image signal and a fourth image signal, respectively. The third image signal and the fourth image signal may be a component signal that is excluded in a second image signal that is input to the first signal transmission device 100 among the plurality of component signals. Therefore, the third image signal may represent a second component signal and the fourth image signal may represent a third component signal.

For example, when the second image signal that is input to the first image input connector 110a is a luminance signal (Y), a blue color difference signal (Pb) may be input to the second image input connector 210a and a red color difference signal (Pr) may be input to the third image input connector 210b.

When the second image signal that is input to the first image input connector 110a is a blue color difference signal (Pb) among a component signal, a luminance signal (Y) may be input to the second image input connector 210a and a red color difference signal (Pr) may be input to the third image input connector 210b.

When the second image signal that is input to the first image input connector 110a is a red color difference signal (Pr) among a component signal, a luminance signal (Y) may be input to the second image input connector 210a and a blue color difference signal (Pb) may be input to the third image input connector 210b.

The plurality of cables 230a and 230b may include a second cable 230a connecting the second image input connector 210a to the second output connector 220 and a third cable 230b connecting the third image input connector 210b to the second output connector 220.

The second output connector 220 may be connected to all of the plurality of input connectors 210a and 210b via the plurality of cables 230a and 230b to transmit a plurality of image signals input from the second external device 3 to the display apparatus 1.

The second output connector 220 may also include a second output terminal 221 that is insertable to the second input terminal 21b of the display apparatus 1. When the second output terminal 221 of the second signal transmission device 200 is inserted into the second input terminal 21b of the display apparatus 1 and the plurality of input connector 210a and 210b is connected to the second external device 3, the display apparatus 1 and the second external device 3 may be connected to each other via the second signal transmission device 200.

According to an exemplary embodiment, because the first signal transmission device 100 selectively receives an input of an image signal in a variety of formats via a single first image input connector 110a, the number of the cable and the input connector of the second signal transmission device 200 may be reduced. Therefore, the miniaturization and the simplification of the display apparatus 1 provided with the first signal transmission device 100 and the second signal transmission device 200 may be achieved.

In addition, since the first signal transmission device 100 and the second signal transmission device 200 are configured with a single output connector 120 and 220 connected to the display apparatus 1, respectively, the one terminal 21a and 21b may be formed in the display apparatus 1 to connect the output connector 120 and 220 thereby achieving the simplification of the exterior of the display apparatus 1. In addition, it may reduce the user's difficulties in determining which connector is inserted into which terminal.

FIGS. 5 and 6 illustrate that the input connectors 110a, 110b, 110c, 210a, and 210b are female connectors. In this case, the first signal transmission device 100 and the second signal transmission device 200 may be connected to the external devices 2 and 3 via an additional external cable, and a detail description thereof will be described later. In addition, an output terminal of the external devices 2 and 3 may be implemented by a male terminal so that the output terminal of the external devices 2 and 3 is directly connected to the input connector 110a, 110b, 110c, 210a, and 210b of the signal transmission device 100 and 200.

However, an exemplary embodiment of the display apparatus 1 is not limited thereto, and thus a male terminal, which is similar to the output terminal 121 and 222, is formed in the input connector 110a, 110b, 110c, 210a, and 210b so that the input connector 110a, 110b, 110c, 210a, and 210b may be implemented by a male terminal.

Therefore, according to an exemplary embodiment, connecting the signal transmission device 100 and 200 to the external devices 2 and 3 may include connecting the input connector 110a, 110b, 110c, 210a, and 210b of the signal transmission device 100 and 200 to the terminal of the external devices 2 and 3 via another cable, as well as connecting the input connector 110a, 110b, 110c, 210a, and 210b of the signal transmission device 100 and 200 directly to the terminal of the external devices 2 and 3.

Figure 7:
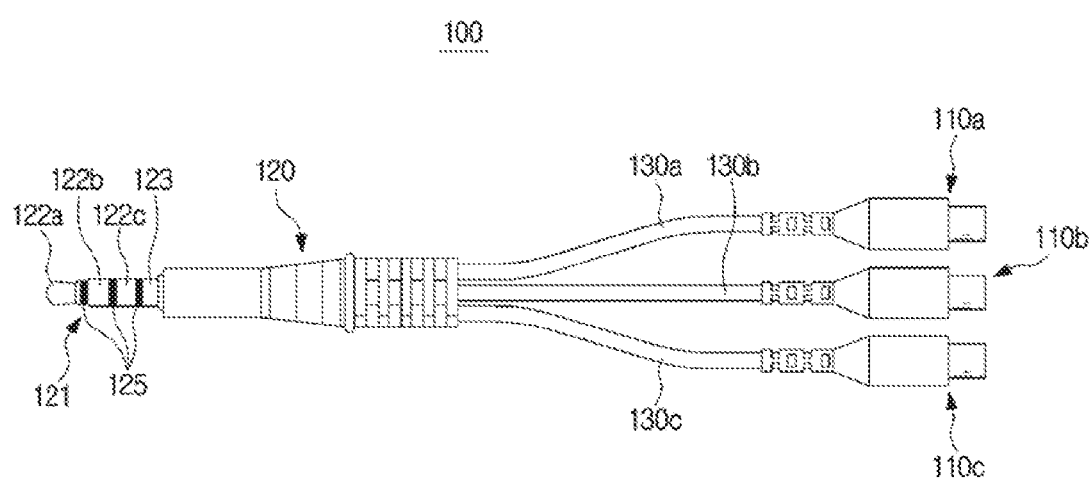
FIG. 7 is a view illustrating a structure of an output connector of a first signal transmission device, according to an exemplary embodiment.
Figure 8:
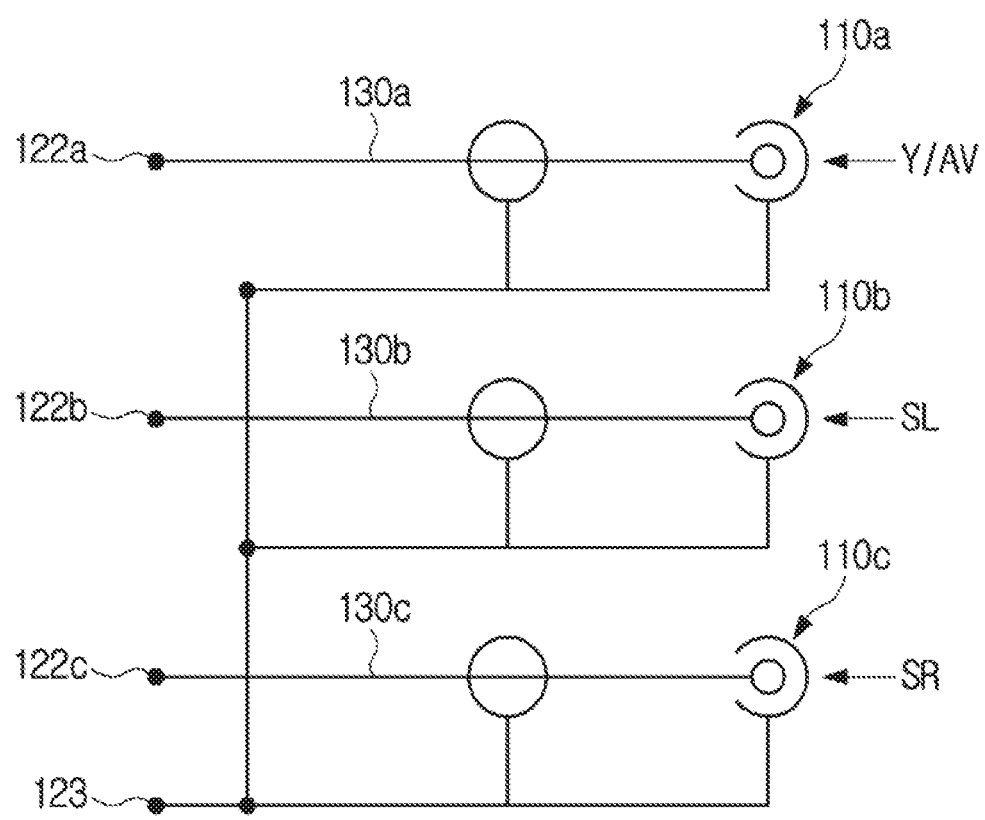
FIG. 8 is a view illustrating a circuit between an output connector and an input connector of a first signal transmission device, according to an exemplary embodiment.

FIG. 7 is a view illustrating a structure of an output connector of a first signal transmission device, and FIG. 8 is a view illustrating a circuit between an output connector and an input connector of a first signal transmission device.

Referring to FIG. 7, a first output terminal 121 of the first signal transmission device 100 may be implemented by a single pin type, and a plurality of signal areas 122a, 122b, and 122c corresponding to the plurality of input connectors 110a, 110b, and 110c may be formed in the first output terminal 121.

A first image signal area 122a may be connected to the first video cable 130a to transmit a first image signal or a second image signal, which is input via the first image input connector 110a, to the display apparatus 1.

The left sound signal area 122b may be connected to the left audio cable 130b to transmit a left sound signal, which is input via the left sound input connector 110b, to the display apparatus 1.

The right sound signal area 122c may be connected to the right audio cable 130c to transmit a right sound signal, which is input via the right sound input connector 110c, to the display apparatus 1.

A ground area 123 may be further formed in the output terminal 121, and the ground area 123 may be connected to a ground of the first image input connector 110a, the left sound input connector 110b and the right sound input connector 110c, as illustrated in FIG. 8.

The first image signal area 122a, the left sound signal area 122b, the right sound signal area 122c and the ground area 123 may be formed in a longitudinal direction of the output terminal 121, and an insulation material 125 may be disposed among the image signal area 122a, the left sound signal area 122b, the right sound signal area 122c and the ground area 123 to prevent signals that are transmitted to each area from being crossed to each other.

According to an exemplary embodiment, the signal transmission device 100 may individually transmit an image signal, a left sound signal, and a right sound signal to the display apparatus 1 via the one output terminal 121. Accordingly, because the display apparatus 1 individually receives the image signal, the left sound signal, and the right sound signal via the one input terminal 21a, the complexity of the exterior of all of the signal transmission device 100, the display apparatus 1, and the display apparatus 1 connected to the signal transmission device 100 may be reduced.

Figure 9:
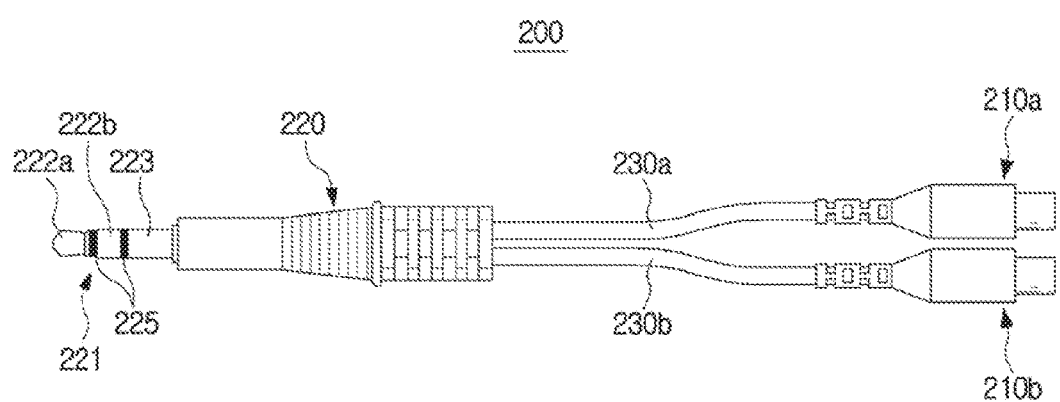
FIG. 9 is a view illustrating a structure of an output connector of a second signal transmission device, according to an exemplary embodiment.
Figure 10:
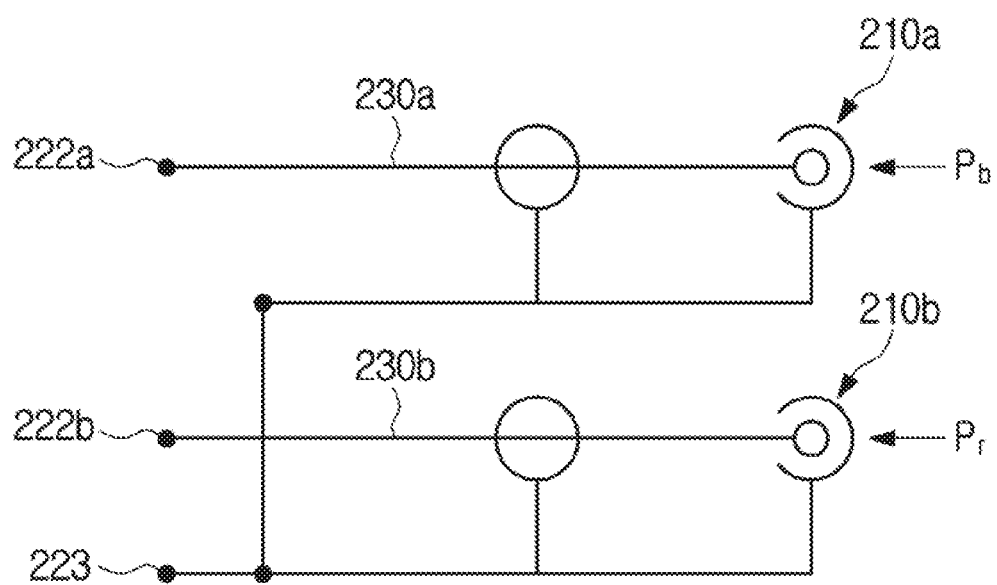
FIG. 10 is a view illustrating a circuit between an output connector and an input connector of a second signal transmission device, according to an exemplary embodiment.

FIG. 9 is a view illustrating a structure of an output connector of a second signal transmission device, and FIG. 10 is a view illustrating a circuit between an output connector and an input connector of a second signal transmission device.

Referring to FIG. 9, a second output terminal 221 of the second signal transmission device 200 may be implemented by a single pin type, and a plurality of signal areas 222a, and 222b corresponding to the plurality of input connectors 210a, and 210b may be formed in the second output terminal 221.

A second image signal area 222a may be connected to a second video cable 230a to transmit a second image signal, which is input via the second image input connector 210a, to the display apparatus 1.

A third image signal area 222b may be connected to a third video cable 230b to transmit a third image signal, which is input via the third image input connector 210b, to the display apparatus 1.

A ground area 223 may be further formed in the second output terminal 221, and the ground area 223 may be connected to a ground of the second image input connector 210a and the third image input connector 210b, as illustrated in FIG. 10.

The second image signal area 222a, the third image signal area 222b, and the ground area 223 may be formed in a longitudinal direction of the second output terminal 221, and an insulation material 225 may be disposed among the second image signal area 222a, and the third image signal area 222b and the ground area 223 to prevent signals that are transmitted to each area from being crossed to each other.

According to an exemplary embodiment, the first signal transmission device 100 and the second signal transmission device 200 may individually transmit an image signal, a left sound signal, and a right sound signal to the display apparatus 1 via the one output terminal 121 and 221, respectively.

Accordingly, because the display apparatus 1 individually receives the image signal, the left sound signal, and the right sound signal via the one input terminal 21a or the two input terminals 21a and 21b, the complexity of the exterior of all of the signal transmission device 10, the display apparatus 1 and the display apparatus 1 connected to the signal transmission device 10 may be reduced.

A component signal and a composite signal may be transmitted via a separate cable in a conventional structure, but the signal transmission device 10, according to an exemplary embodiment, transmits one of component signals, and a composite signal via a signal video cable 110a, thereby achieving a reduction of the complexity of the exterior by reducing the number of cables.

Figure 11:
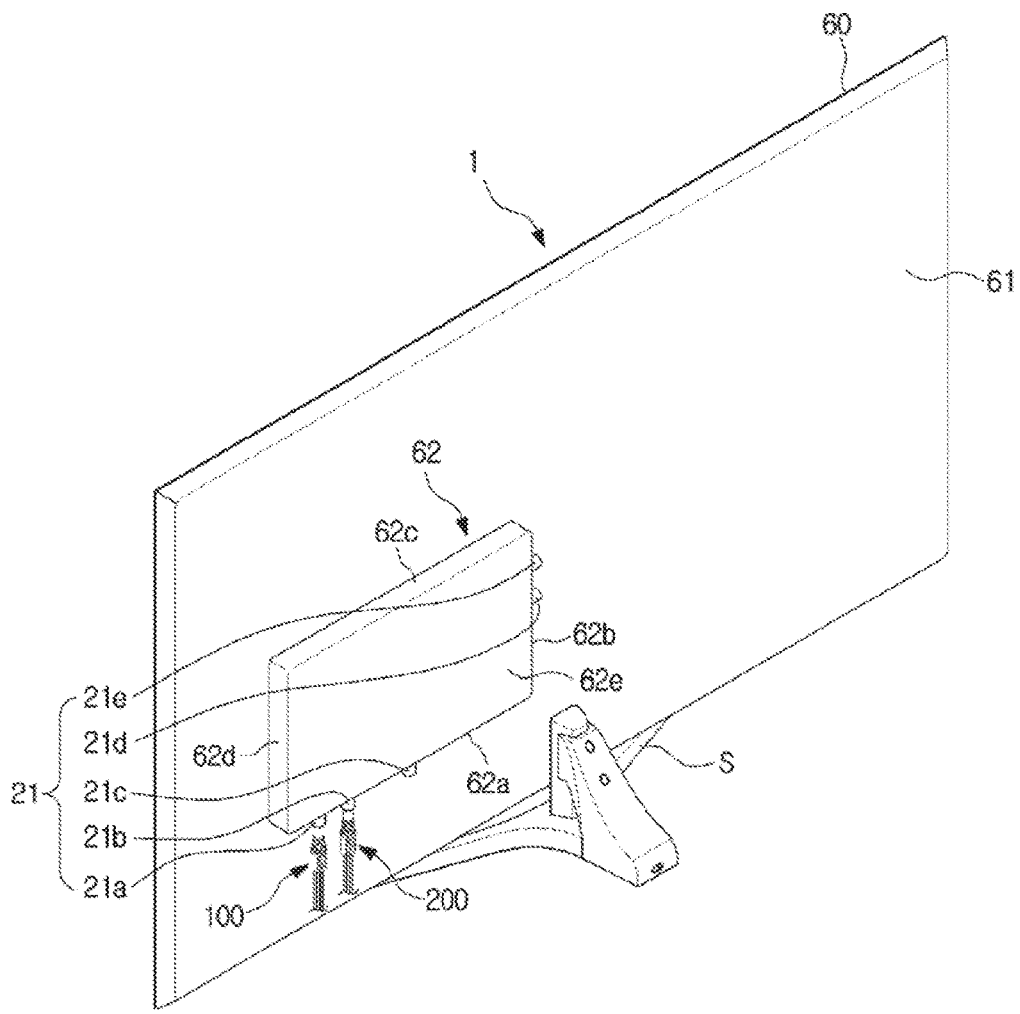
FIGS. 11 and 12 are views of an example of a structure in which a signal transmission device is connected to a display apparatus, according to an exemplary embodiment.
Figure 12:
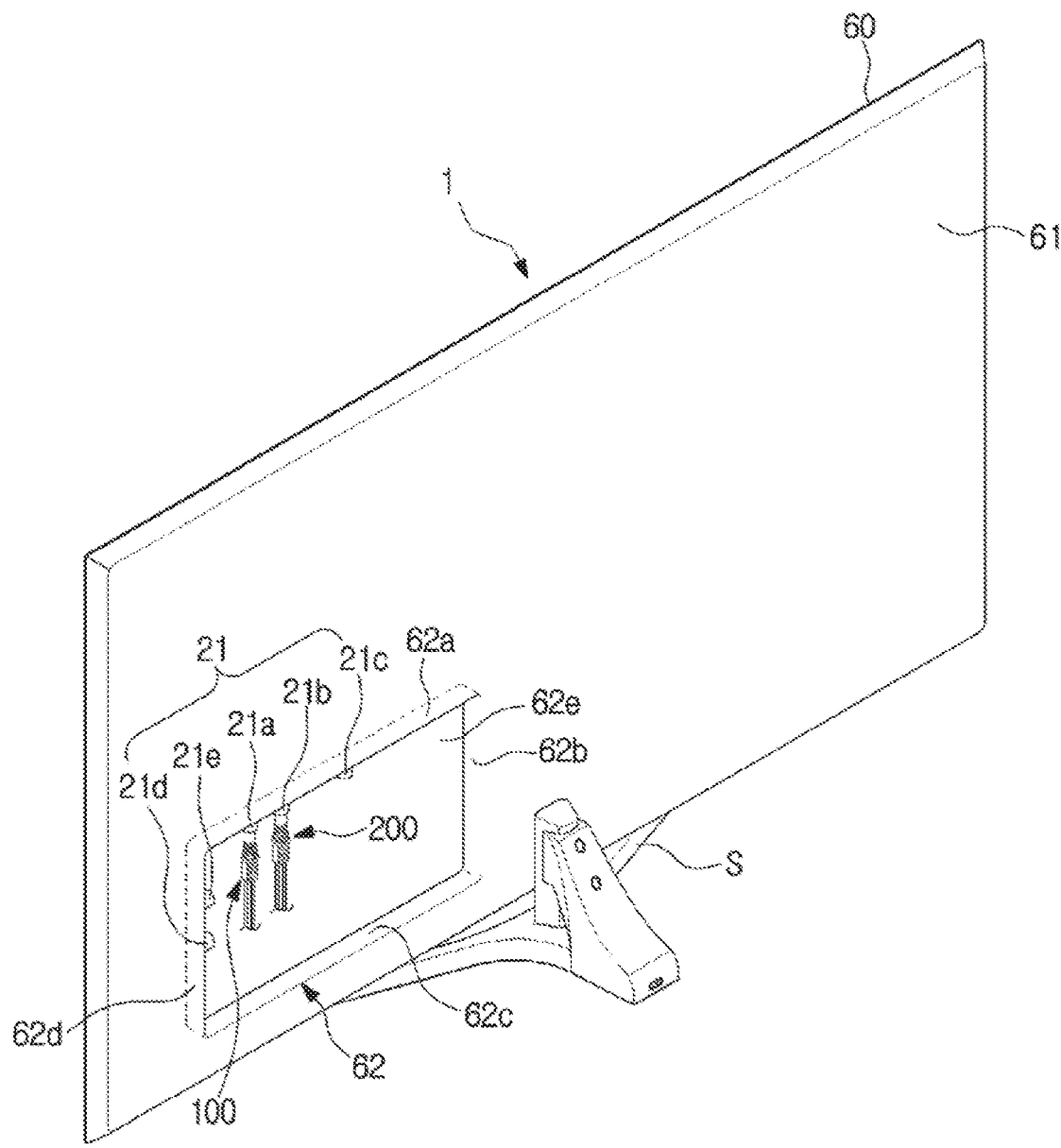

FIGS. 11 and 12 are views of an example of a structure in which a signal transmission device is connected to a display apparatus.

Referring to FIGS. 11 and 12, a terminal installation unit 62 in which the terminal unit 21 is formed may be provided on a body rear surface 61 of the display apparatus 1.

For example, the terminal installation unit 62 may protrude from the body rear surface 61 to the outside, as illustrated in FIG. 11, or alternatively, the terminal installation unit 62 may be recessed from the body rear surface 61 to the inside of the body 60, as illustrated in FIG. 12.

Referring to FIGS. 11 and 12, the terminal installation unit 62 may have five sides, wherein four sides 62a, 62b, 62c, and 62d among the five sides may be perpendicular to the body rear surface 61 and a single side 62e may be parallel to the body rear surface 61.

The terminal unit 21 may be formed on at least one of sides 62a, 62b, 62c, and 62d perpendicular to the body rear surface 61. In this case, because the signal transmission device 10 is inserted in a parallel direction to the body 60 of the display apparatus 1, the signal transmission device 10 may not take a volume in a width direction and thus it may be easy for the display apparatus 1 to be close to the wall.

For example, the first input terminal 21a and the second input terminal 21b may be formed on a side 62a that is toward the ground. The first output terminal 121 of the first signal transmission device 100 may be inserted into the first input terminal 21a in a parallel direction to the display unit 40, and the second output terminal 221 of the second signal transmission device 200 may be inserted into the second input terminal 21b in a parallel direction to the display unit 40.

The external devices 2 and 3, which may be connected to the display apparatus 1, may be disposed under the display apparatus 1, and thus it may be easy to connect the external devices 2 and 3 disposed under the display apparatus 1 to the display apparatus 1 when the signal transmission device 10 is connected to the display apparatus 1 from downside to upside.

In addition, as well as the first terminal 21a and the second terminal 21b, terminals 21c, 21d, and 21e configured to receive an input of an image signal having another format may be further formed in the terminal installation unit 62.

For example, an antenna input terminal 21c configured to receive an input of a broadcast signal via an antenna cable, a PC input terminal 21d configured to receive an input of an image signal via a PC cable, and a HDMI terminal 21e configured to receive an input of a digital image signal via a HDMI cable may be further formed in the terminal installation unit 62.

However, the position and the shape of the terminal installation unit 62 and the position and the number of the terminal unit 21 is not limited to examples illustrated in FIGS. 11 and 12. Thus, the position and the shape of the terminal installation unit 62 and the position and the number of the terminal unit 21 may be implemented in a different manner from the above-mentioned example in consideration of the number of the terminal unit 21, the type of the cable connected to the terminal unit 21, and the position of the external device connected via the cable.

Figure 13:
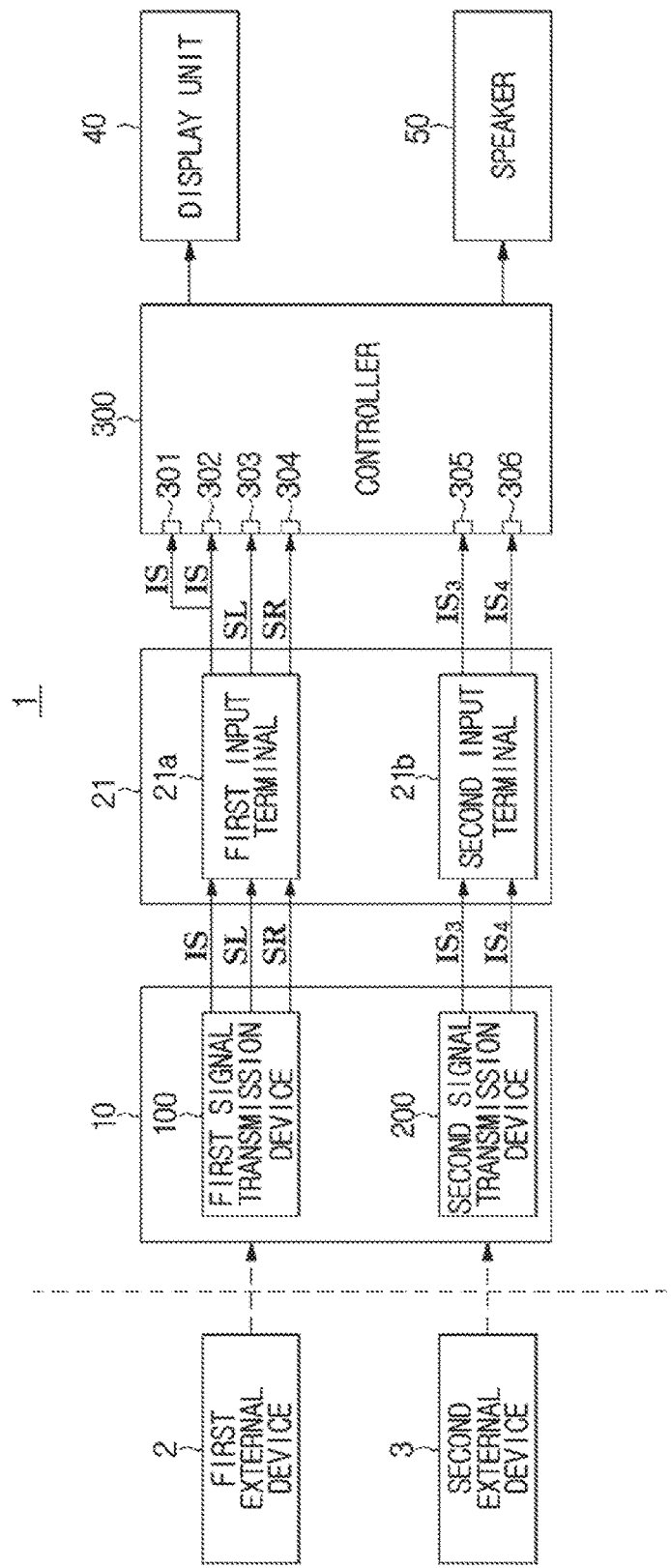
FIG. 13 is a control block diagram of a display apparatus according to an exemplary embodiment.
Figure 15:
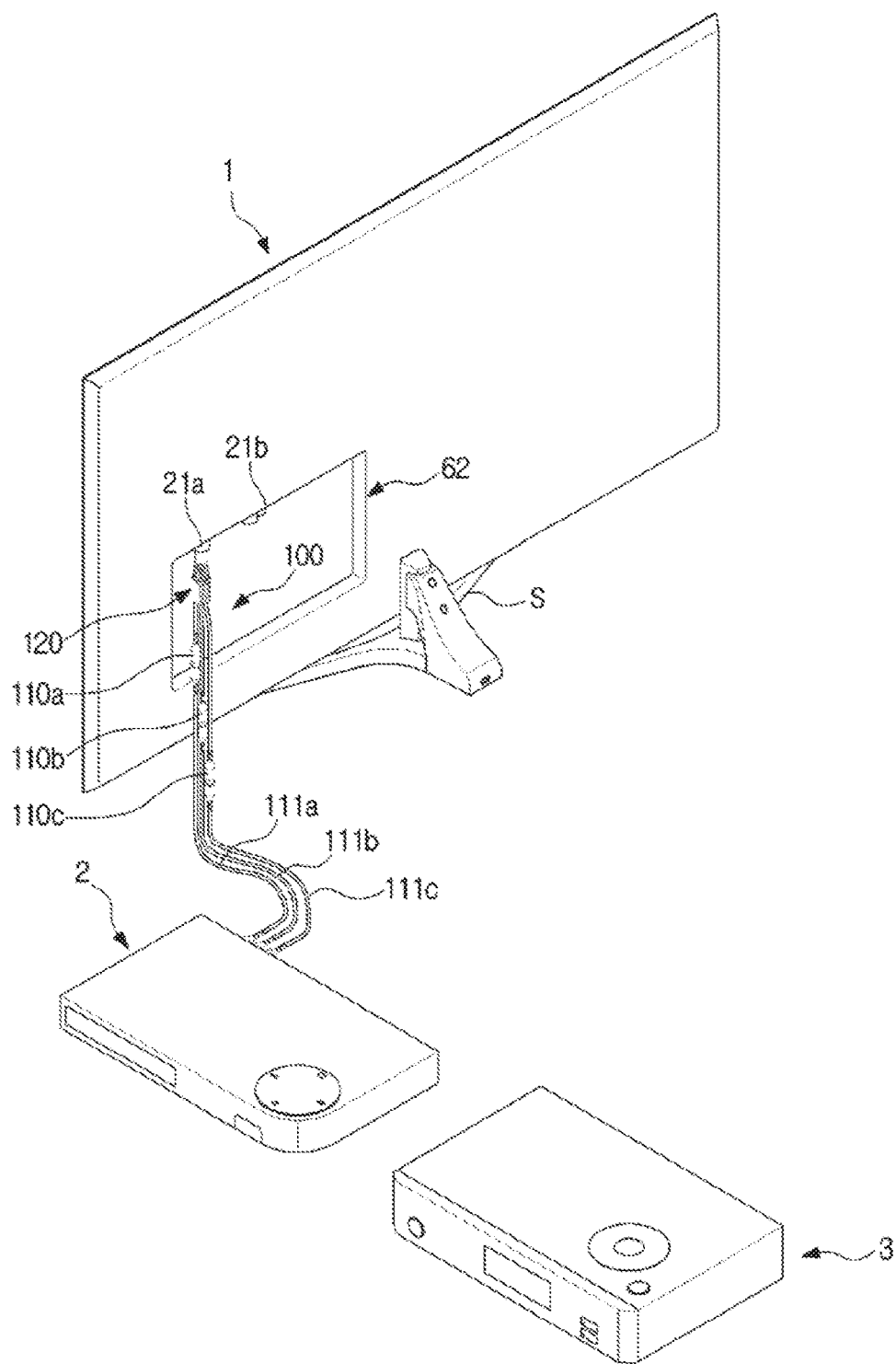
FIGS. 15 to 17 are views of a variety of connection states of a first signal transmission device and a second signal transmission device, and a display apparatus, according to an exemplary embodiment.
Figure 16:
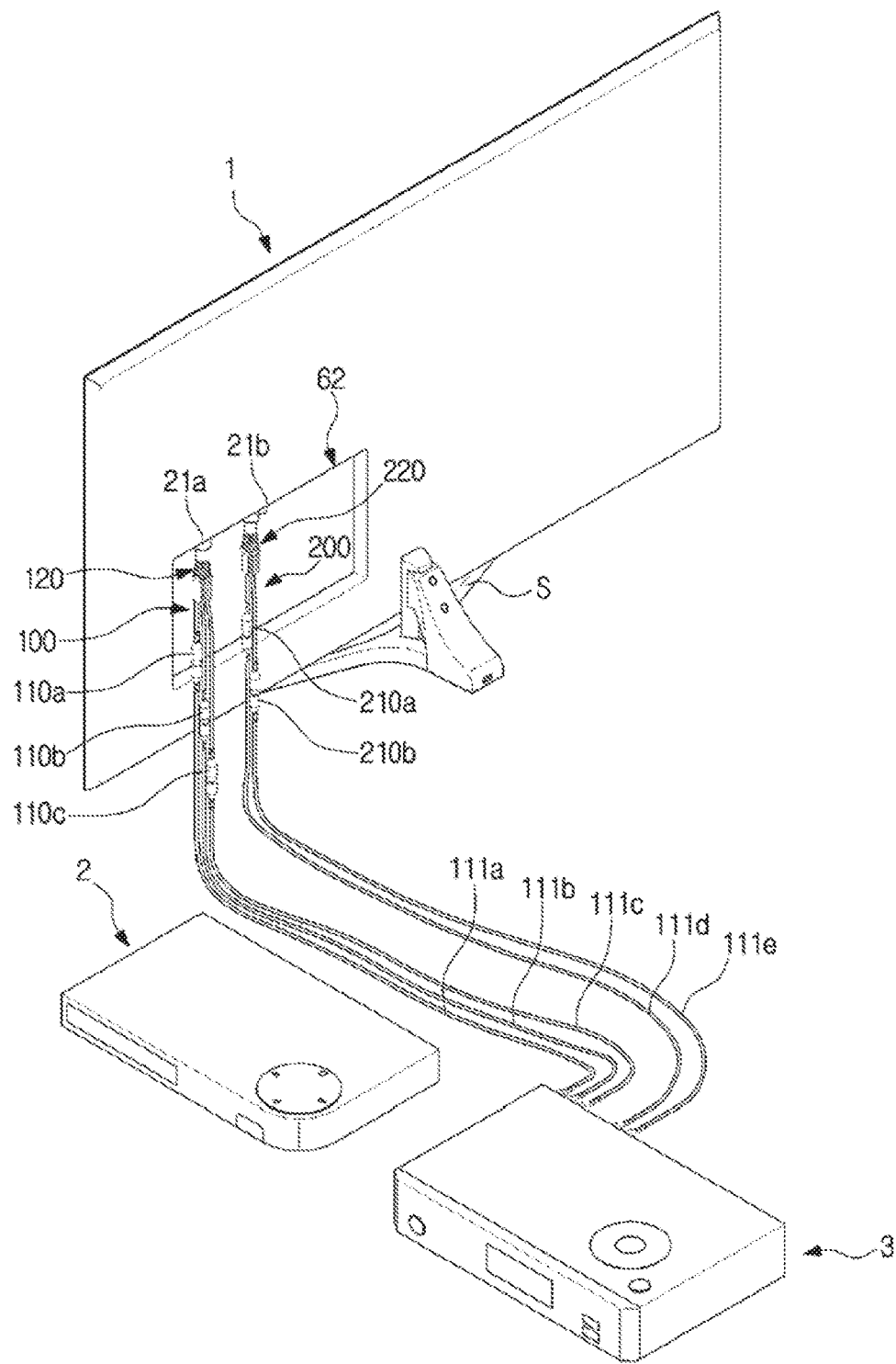
Figure 17:
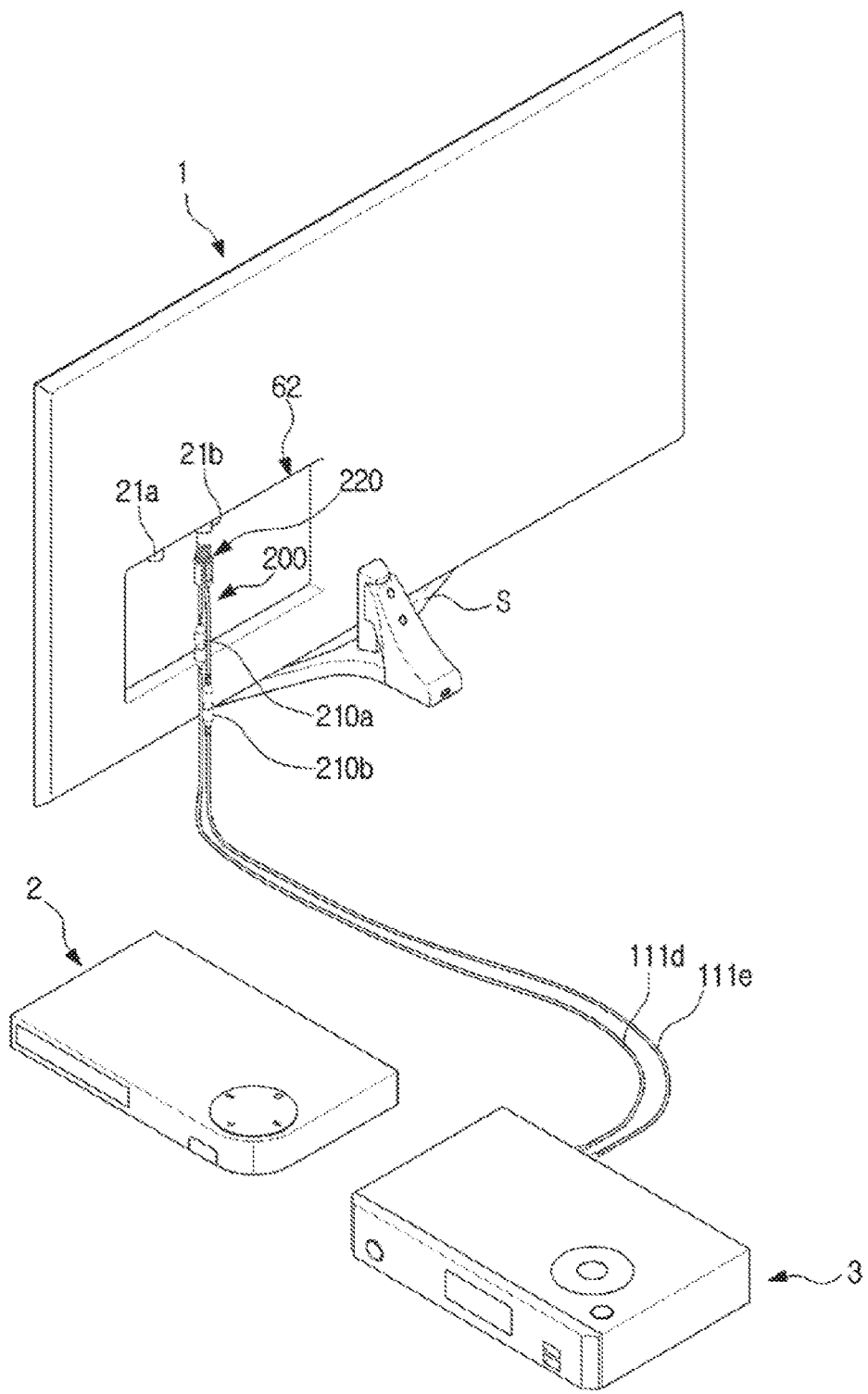

FIG. 13 is a control block diagram of a display apparatus according to an exemplary embodiment, FIG. 14 is a table of an output mode determined by whether a first signal transmission device and a second signal transmission device are connected to a display apparatus or not, and FIGS. 15 to 17 are views of a variety of connection states of a first signal transmission device and a second signal transmission device, and a display apparatus.

Referring to FIG. 13, when the first output terminal 121 of the first signal transmission device 100 is inserted into the first input terminal 21*a*, an image signal (IS) may be input via the first image signal area 122*a*, a sound left (SL) signal may be input via the left sound signal area 122*b*, and a sound right (SR) signal may be input via the right sound signal area 122*c*.

When the second output terminal 221 of the second signal transmission device 200 is inserted into the second input terminal 21*b*, a third image signal ($IS_3$) may be input via the second image signal area 222*a* and a fourth image signal ($IS_4$) may be input via the third image signal area 222*b*.

As described above, the first image input connector 110*a* of the first signal transmission device 100 may receive an input of a first image signal and an input of a second image signal having a format that is different from that of the first image signal.

For example, when the first image input connector 110*a* is connected to the external device 2 outputting a composite signal, a composite signal may be input as the first image signal, and when the first image input connector 110*a* is connected to the external device 3 outputting a component signal, a first component signal may be input as the second image signal.

When the first image input connector 110*a* selectively receives a luminance signal and a composite signal, the second image signal may be a luminance signal (Y), the third image signal ($IS_3$) may be a blue color difference signal (Pb), and the fourth image signal ($IS_4$) may be a red color difference signal (Pr).

In the same way, when the first image input connector 110*a* selectively receives a blue color difference signal and a composite signal, the second image signal may be a blue color difference signal (Pb), the third image signal ($IS_3$) may be a luminance signal (Y), and the fourth image signal ($IS_4$) may be a red color difference signal (Pr).

In addition, when the first image input connector 110*a* selectively receives a red color difference signal (Pr) and a composite signal, the second image signal may be a red color difference signal (Pr), the third image signal (IS3) may be a luminance signal (Y), and the fourth image signal (IS4) may be a blue color difference signal (Pb).

When the first signal transmission device 100 is connected to the first input terminal 21*a*, an image signal transmitted by the first signal transmission device 100 may be the first image signal or the second image signal. According to an exemplary embodiment, the display apparatus 1 may automatically determine an image output mode of the display apparatus 1 based on the presence of the connection with the first signal transmission device 100 and the presence of the connection with the second signal transmission device 200.

For example, as illustrated in FIG. 13, a wire transmitting a signal input from the first signal transmission device 100 may be shorted and then connected to a first image signal input port 301 and a second image signal input port 302 of the controller 300. When an image signal transmitted via the first signal transmission device 100 is the first image signal, the image signal may be input to both of the first image signal input port 301 and the second image signal input port 302, and when an image signal transmitted via the first signal transmission device 100 is the second image signal, the image signal may be input to both of the first image signal input port 301 and the second image signal input port 302.

The remaining signals, the sound left (SL) signal, the sound right (SR) signal, the third image signal ($IS_3$) and the fourth image signal ($IS_4$), may be input to an input port 303, 304, 305, and 306 corresponding to the sound left (SL) signal, the sound right (SR) signal, the third image signal ($IS_3$) and the fourth image signal ($IS_4$), respectively.

Below, for convenience of description, a composite signal or a luminance signal is transmitted via the first signal transmission device 100, and a blue color difference signal (Pb) and a red color difference signal (Pr) are transmitted via the second signal transmission device 200.

Referring to FIG. 14, when neither of the first signal transmission device 100 and the second signal transmission device 200 are connected to the display apparatus 1, the controller 300 may deactivate both of a first mode and a second mode.

When the first signal transmission device 100 is connected and the second signal transmission device 200 is not connected, the controller 300 may activate the first mode and deactivate the second mode.

When the first signal transmission device 100 is not connected and the second signal transmission device 200 is connected, the controller 300 may deactivate both of the first mode and the second mode.

When both of the first signal transmission device 100 and the second signal transmission device 200 are connected, the controller 300 may deactivate the first mode and activate the second mode.

According to an exemplary embodiment, the activation of the mode may represent converting an image output mode into the corresponding mode.

According to an exemplary embodiment, each of connecting the signal transmission device 100 and 200 to the display apparatus 1, connecting the signal transmission device 100 and 200 to the input terminal 21*a* and 21*b*, and connecting the output connector 110 and 220 of the signal transmission device 100 and 200 to the display apparatus 1 or the input terminal 21*a* and 21*b*, may include inserting the output terminal 121 and 221 to the input terminal 21*a* and 21*b*.

As described above, connecting the signal transmission device 100 and 200 to the external devices 2 and 3 may include connecting the signal transmission device 100 and 200 to the terminal of the external devices 2 and 3 via another cable, as well as connecting the signal transmission device 100 and 200 directly to the external devices 2 and 3.

Below, each case illustrated in FIG. 14 will be described in detail with reference to FIGS. 15 to 17. It may be assumed that the first signal transmission device 100 and the second signal transmission device 200 are connected to the external devices 2 and 3 via an external cable 111*a*, 111*b*, 111*c* and 111*d*.

Referring to FIGS. 15 and 17, the display apparatus 1, the input connector 110*a*, 110*b*, 110*c*, 210*a* and 210*b* of the signal transmission device 100 and 200, and the external devices 2 and 3 may be connected to each other via an additional external cable 111a, 111b, 111c, 111d and 111e.

For example, the external cable 111a, 111b, 111c, 111d and 111e may be any one of genders, e.g., a conversion gender converting the size of signal, an extension gender extending a length, and a division gender dividing a terminal into several terminals.

The additional external cable 111a, 111b, 111c, 111d and 111e may have an output terminal corresponding to the number of input connectors 110a, 110b, 110c, 210a, and 210b of the signal transmission device 100 and 200, and the number of the input terminal connected to the external device 3 may correspond to the number of the output terminal of the external device 3.

To output an image provided in a composite method from the external device 2, e.g., a video player, via the display apparatus 1, a Composite video Blanking and Sync (CVBS) and a sound signal (SL, and SR) may be needed to input the display apparatus 1.

Therefore, when a user wants to watch an image provided in a composite method from the first external device 2, the input connectors 110a, 110b, and 110c of the first signal transmission device 100 may be connected to the first external device 2, and the output connector 120 may be connected to the display apparatus 1, as illustrated in FIG. 15. In this case, the first external device 2 and the first signal transmission device 100 may be connected to each other via the additional external cable 111a, 111b, and 111c, but alternatively, when the input connectors 110a, 110b, and 110c of the first signal transmission device 100 are provided with an input terminal that is insertable into the first external device 2, the first signal transmission device 100 may be directly connected to the first external device 2 without the external cable.

When only the first signal transmission device 100 between the first signal transmission device 100 and the second signal transmission device 200 is connected to the display apparatus 1, the controller 300 may recognize as an input of a composite signal and then activate the first mode.

To prepare a case in which the first signal transmission device 100 and the second signal transmission device 200 are connected to the display apparatus 1 with a time difference, the controller 300 may be in a standby state without determining an output mode for a predetermined period of time after the first signal transmission device 100 or the second signal transmission device 200 is connected to the first input terminal 21a or the second input terminal 21b.

For example, when there is an additional connection with the second input terminal 21b within a predetermined period of time after the first signal transmission device 100 is connected to the first input terminal 21a, the controller 300 may recognize as an input of a component signal and then activate the second mode, and when there is no an additional connection, the controller 300 may recognize as an input of a composite signal and then activate the first mode.

In addition, when there is an additional connection with the first input terminal 21a within a predetermined period of time after the second signal transmission device 200 is connected to the second input terminal 21b, the controller 300 may recognize as an input of a component signal and then activate the second mode, and when there is no an additional connection, the controller 300 may recognize it as a case in which one of component signals is missed, and then deactivate both the first mode and the second mode.

To output an image provided in a component method from the external device 3, e.g., a set top box, via the display apparatus 1, three of component image signal, that is a luminance signal (Y), a blue color difference signal (Pb), and a red color difference signal (Pr), and a sound signal (SL, and SR) may be needed to input the display apparatus 1.

Therefore, if a user wants to watch an image provided in a component method from the second external device 3, the input connectors 110a, 110b, and 110c of the first signal transmission device 100 may be connected to the second external device 3, the first output connector 120 may be connected to the display apparatus 1, the input connectors 210a, 210b, and 210c of the second signal transmission device 200 may be connected to the second external device 3, and the second output connector 220 may be connected to the display apparatus 1, as illustrated in FIG. 16.

Also, the first external device 2 and the first signal transmission device 100, and the second external device 3 and the second signal transmission device 200 may be connected via the additional external cable 111a, 111b, 111c, 111d, and 111e, as illustrated in FIG. 16, but alternatively, when the input connectors 110a, 110b, and 110c of the first signal transmission device 100 and the input connectors 210a and 210b of the second signal transmission device 200 are provided with an input terminal that is insertable into the external devices 2 and 3, the first signal transmission device 100 and the second signal transmission device 200 may be directly connected to the external devices 2 and 3, respectively, without the external cable.

When both the first signal transmission device 100 and the second signal transmission device 200 are connected to the display apparatus 1, the controller 300 may recognize as an input of a component signal and then activate the second mode.

When only the second signal transmission device 200 is connected to the display apparatus 1 and the external device 3 and the first signal transmission device 100 is not connected to the display apparatus 1 and the external device 3, the luminance signal (Y) may be not input and thus the controller 300 may deactivate any of the first mode and the second mode.

In addition to the above-mentioned mode determination operation, the controller 300 may further perform a control including a signal process operation configured to process an input signal into the type allowed to be output via the display unit 40 and the speaker 50. A detail description will be described later.

The controller 300 may include a memory, in which a program to perform the above-mentioned operation and the after mentioned operation and a data needed for the operation of the program are stored, and a processor configured operate the stored program.

Memory may include volatile memory, e.g., S-RAM and D-RAM, and nonvolatile memory, e.g. flash memory, Read Only Memory (ROM), Erasable Programmable Read Only Memory (EPROM), and Electrically Erasable Programmable Read Only Memory (EEPROM).

A processor and a memory forming the controller 300 may be integrated in a single chip. In this case, as well as the processor and the memory, another component forming the display apparatus 1 may be integrated in the corresponding chip. In addition, the controller 300 may use a plurality of processors and memories and may share the processor and the memory with another component of the display apparatus 1.

Hereinafter a variety of examples related to an exterior of the signal transmission device 100 and 200 will be described.

Figure 18:
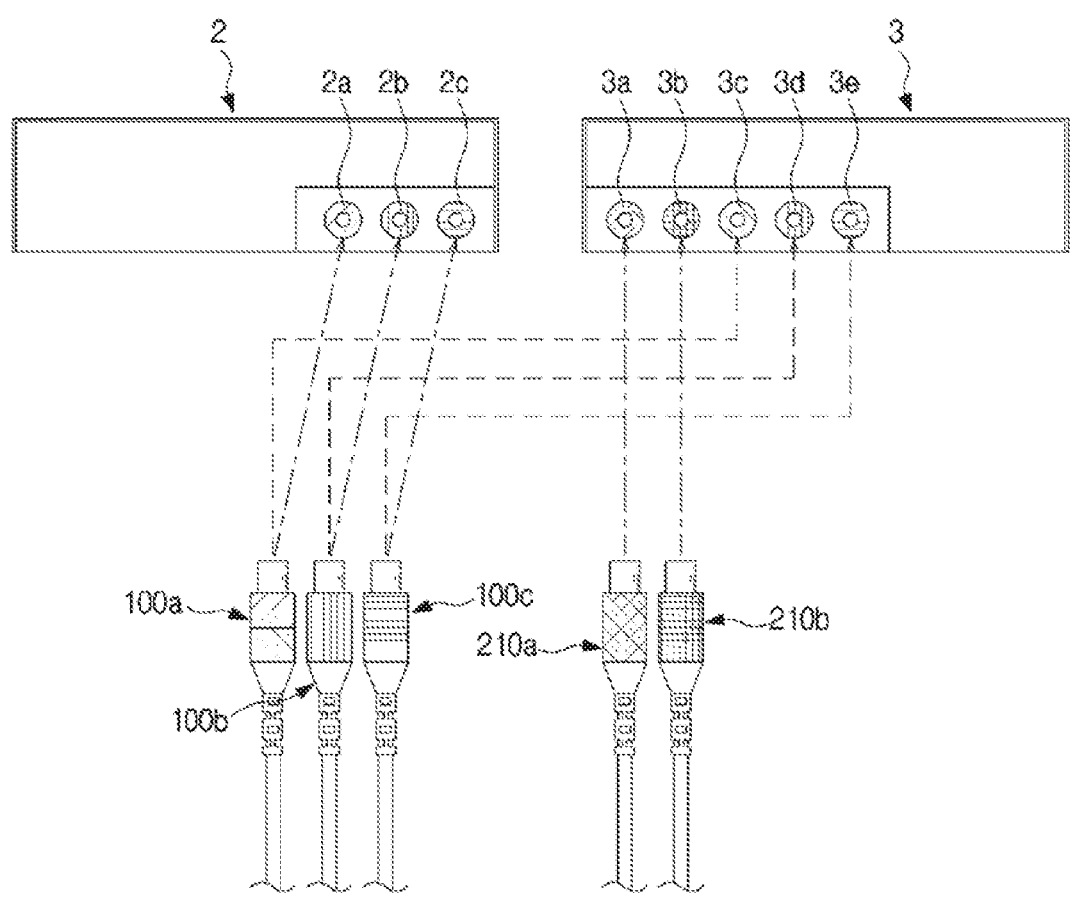
FIGS. 18 and 19 are views of an example of an exterior of a connector of a signal transmission device, according to an exemplary embodiment.
Figure 19:
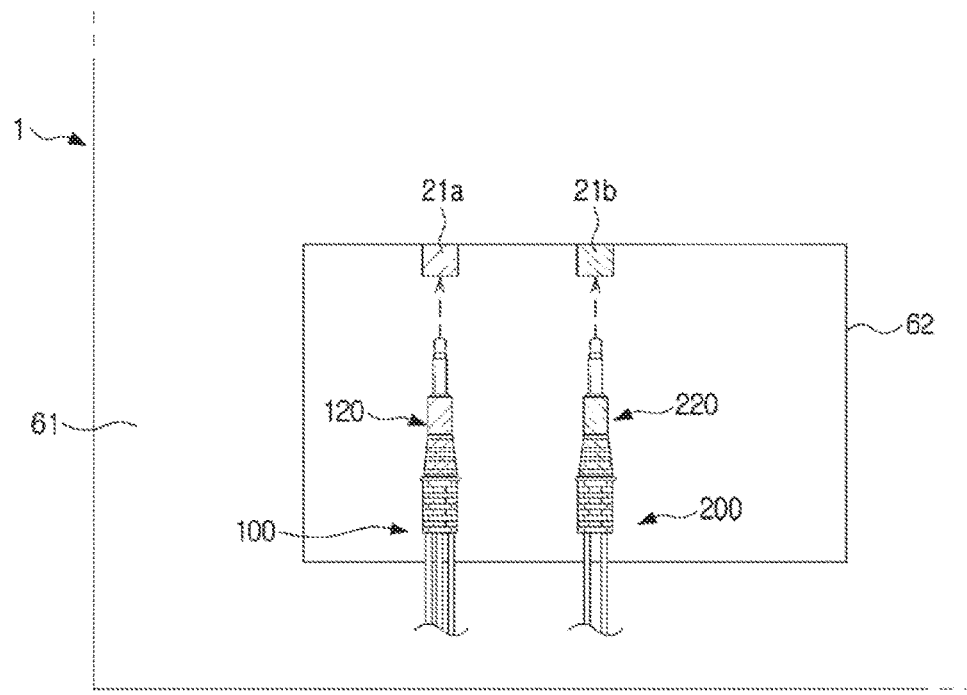

FIGS. 18 and 19 are views of an example of an exterior of a connector of a signal transmission device.

Although the controller 300 determines an output mode of the display apparatus 1 based on the presence of the connection of the signal transmission device 100 and 200, a user may connect the signal transmission device 100 and 200 to the display apparatus 1 and the external devices 2 and 3. Therefore, the user should appropriately insert the input connectors 110*a*, 110*b*, 110*c*, 210*a*, and 210*b* and the output connector 120 and 220 of the signal transmission device 100 and 200 into a terminal of the display apparatus 1 and the external devices 2 and 3.

For this, information related to a terminal to which each connector is connected will be displayed in the signal transmission device 100 and 200. For example, the color of the input connectors 110*a*, 110*b*, 110*c*, 210*a*, and 210*b* to which the external devices 2 and 3 is connected may be different from each other to allow the input connectors 110*a*, 110*b*, 110*c*, 210*a*, and 210*b* to be distinguished from each other, and the same color as that of the input connectors 110*a*, 110*b*, 110*c*, 210*a*, and 210*b* may be displayed on the terminal of the external devices 2 and 3 or the adjacent position to the terminal to guide the user to connect the input connectors 110*a*, 110*b*, 110*c*, 210*a*, and 210*b* to the input terminal 21*a* and 21*b* corresponding thereto, as illustrated in FIG. 18. As mentioned above, it may include a case of connecting via the external cable 111*a*, 111*b*, 111*c*, 111*d*, and 111*e*.

The image input connector 110*a* of the first signal transmission device 100 may be connected to the first external device 2 outputting a composite signal, or connected to the second external device 3 outputting a component signal. Therefore, the image input connector 110*a* may have both of a color corresponding to the image output terminal 2*a* of the first external device 2 and a color corresponding to the image output terminal 3*a* of the second external device 3, as illustrated in FIG. 18.

In this case, as illustrated in FIG. 18, two colors may be arranged in a longitudinal direction of the image input connector 110*a*, but is not limited thereto. If two colors are indicated, there is no limitation in the arrangement direction.

The first image input connector 110*a* of the first signal transmission device 100 may have a green color and a yellow color, the left sound input connector 110*b* may have a white color, and the right sound input connector 110*c* may have an orange color. To correspond to those colors, the image output terminal 2*a* of the first external device 2 may have a yellow color, and the sound output terminal 2*b* and 2*c* may have a white color and an orange color, respectively.

The second image input connector 210*a* of the second signal transmission device 200 may have a green color, and the third image input connector 210*b* of the second signal transmission device 200 may have a red color. To correspond to those colors, the image output terminal 3*a* and 3*b* of the second external device 3 may have a green color and a red color, respectively, and the image output terminal 3*c* in which the remaining one signal of the component signal is output may have a green color to guide the insertion of the first image input connector 110*a* of the first signal transmission device 100.

The sound output terminals 3*d* and 3*e* of the second external device 3 may have a white color and an orange color that is the same color as the sound input connector 110*b* and 110*c* of the first signal transmission device 100, respectively.

As illustrated in FIG. 19, the color of the output connectors 120 and 220 of the signal transmission devices 100 and 200 may be different from each other to allow the output connectors 120 and 220 to be distinguished from each other, and the same color as that of the output connectors 120 and 220 may be displayed on the input terminal 21*a* and 21*b* of the display apparatus 1 or the adjacent position to the input terminal 21*a* and 21*b* to guide the user to appropriately insert the output connector 120 and 220 into the input terminal 21*a* and 21*b* corresponding thereto.

Figure 20:
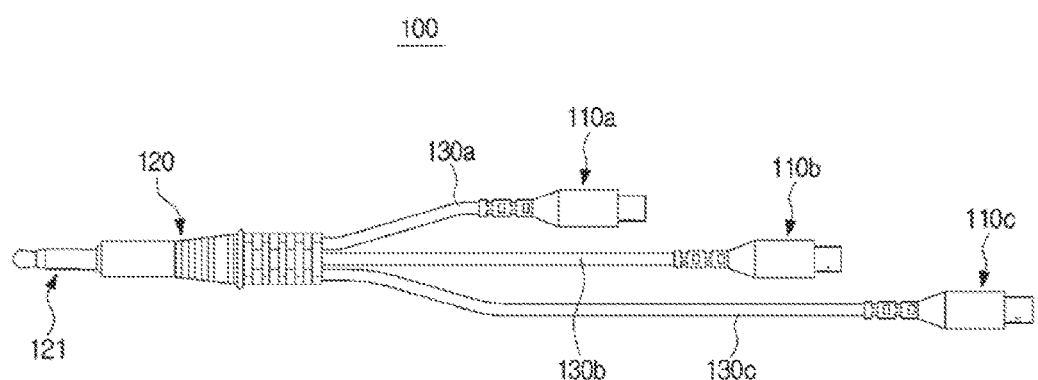
FIGS. 20 and 21 are views of an example of a length of a signal transmission device, according to an exemplary embodiment.
Figure 21:
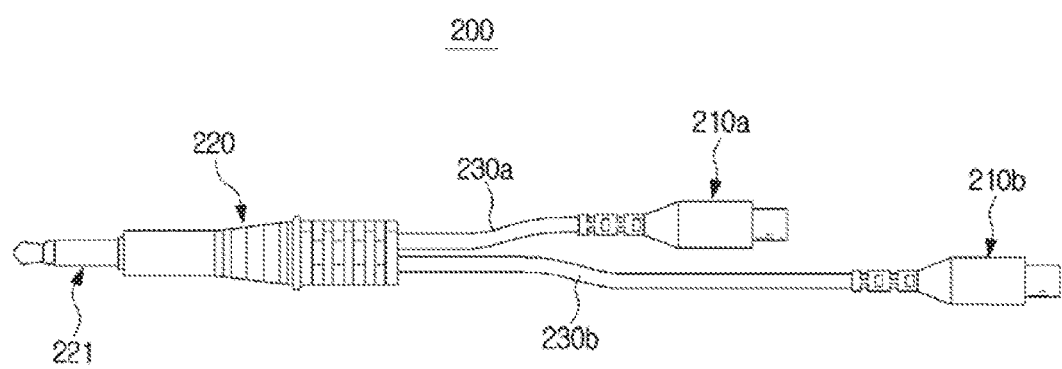

FIGS. 20 and 21 are views of an example of a length of a signal transmission device.

Referring to FIGS. 20 and 21, a length of each cable 130*a*, 130*b*, and 130*c* of the first signal transmission device 100 may be different from each other and also a length of each cable 230*a* and 230*b* of the second signal transmission device 200 may be different from each other.

As long as a length of three cable 130*a*, 130*b*, and 130*c* of the first signal transmission device 100 may be different from each other, and a length of two cables 230*a* and 230*b* of the second signal transmission device 200 may be different from each other, there may be no limitation in that which one of cable is longer or shorter than the others.

The three cables 130*a*, 130*b*, and 130*c* of the first signal transmission device 100 may have a length that is different from the length of two cables 230*a* and 230*b* of the second signal transmission device 200, or part of the three cable 130*a*, 130*b*, and 130*c* of the first signal transmission device 100 may have the same length as that of two cables 230*a* and 230*b* of the second signal transmission device 200.

As illustrated in FIGS. 20 and 21, in which each cable is a different length from each other, the input connectors 110*a*, 110*b*, 110*c*, 210*a*, and 210*b* may be not overlapped. Therefore, when the display apparatus 1 is mounted to the wall, it may be prevented that the display apparatus 1 is not allowed to be maximally closed to the wall due to the increase of the volume of the overlapped input connectors 110*a*, 110*b*, 110*c*, 210*a*, and 210*b*.

Figure 22:
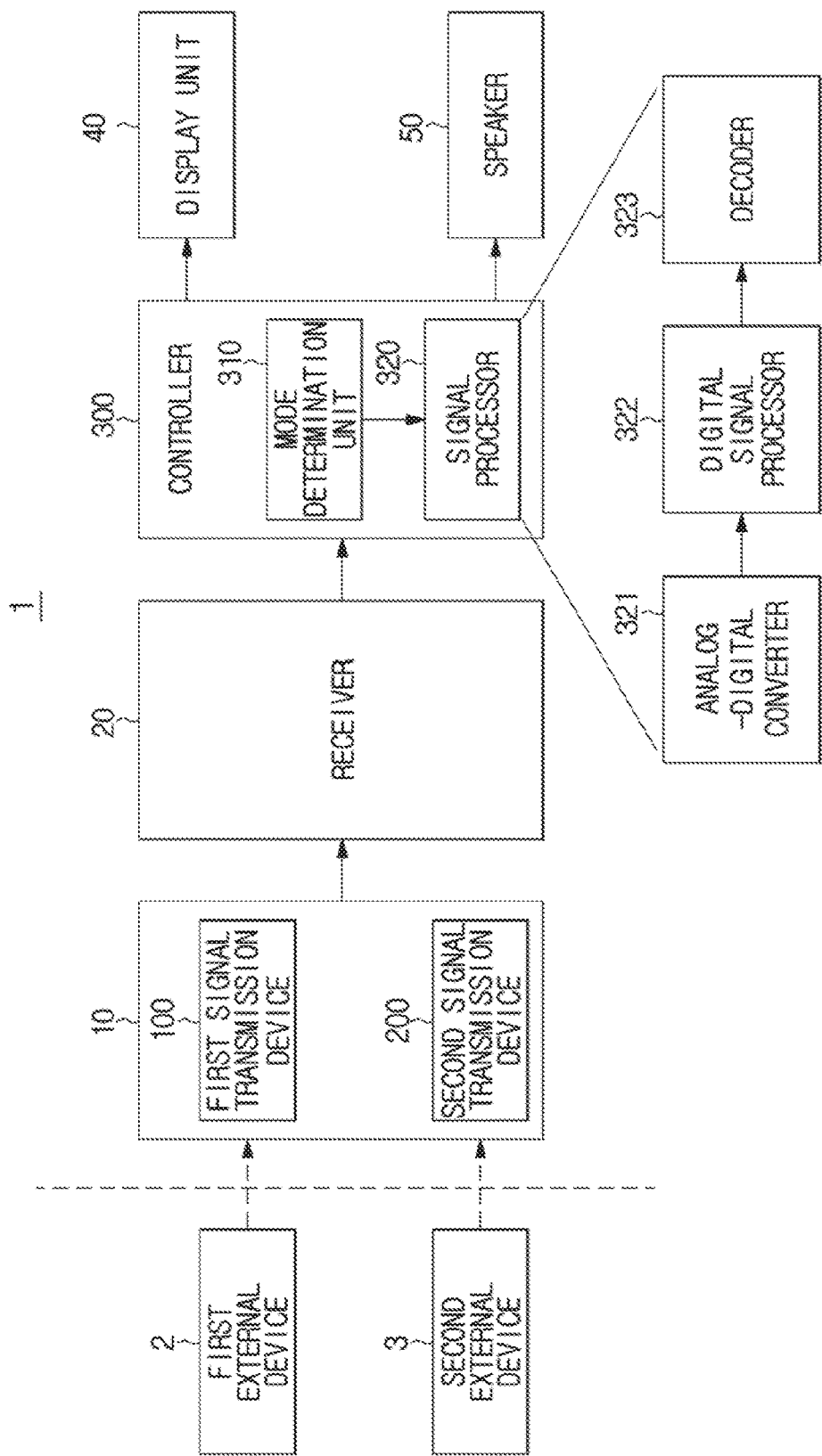
FIG. 22 is a control block diagram illustrating a configuration of a controller of a display apparatus according to an exemplary embodiment.

FIG. 22 is a control block diagram illustrating a configuration of a controller of a display apparatus according to an exemplary embodiment.

Referring to FIG. 22, the controller 300 may include a mode determination unit 310 configured to determine an image output mode of the display apparatus 1 based on a connection state between the receiver 20 and the signal transmission device 10, and a signal processor 320 configured to process the received image signal and sound signal to have the type allowing to be output via the display unit 40 and the speaker 50.

For example, the signal processor 320 may include an analog-digital converter 321 configured to convert an analog signal input from the external devices 2 and 3 into a digital signal, a digital signal processor 322 configured to process the digital signal to have the type allowing to be output via the display unit 40 and the speaker 50, and a decoder 323 configured to decode the image signal and the sound signal to output the signal via the display unit 40 and the speaker 50.

The signal processor 320 may further include a Demultiplexer (DEMUX) configured to separate an image signal and a sound signal from a broadcast signal output from a tuner. The tuner may extract a signal corresponding to a certain broadcast channel from a plurality of broadcast signals received by an antenna of the display apparatus 1.

As for the decoder 323, a decoder configured to decode an image signal and a decoder configured to decode a sound signal may be separately provided, or a single decoder configured to decode an image signal and a sound signal may be provided.

In addition, the decoder 323 may be implemented by a software decoder or a hardware decoder.

The mode determination unit 310 and the signal processor 320 may share the same processor and memory or may use a separate processor and memory.

Figure 23:
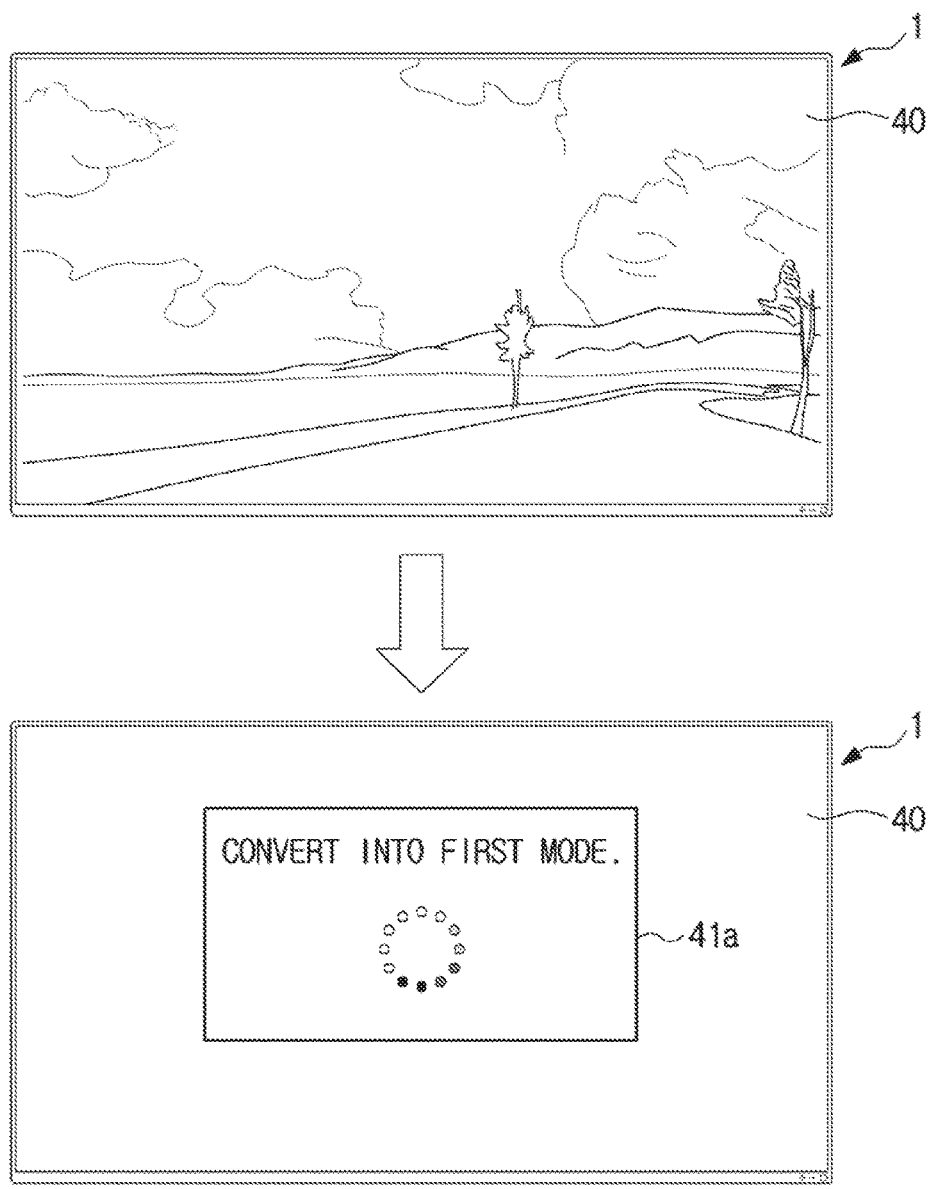
FIGS. 23 and 24 are views of an example of a screen displayed on a display apparatus to provide information related to a mode conversion, according to an exemplary embodiment.
Figure 24:
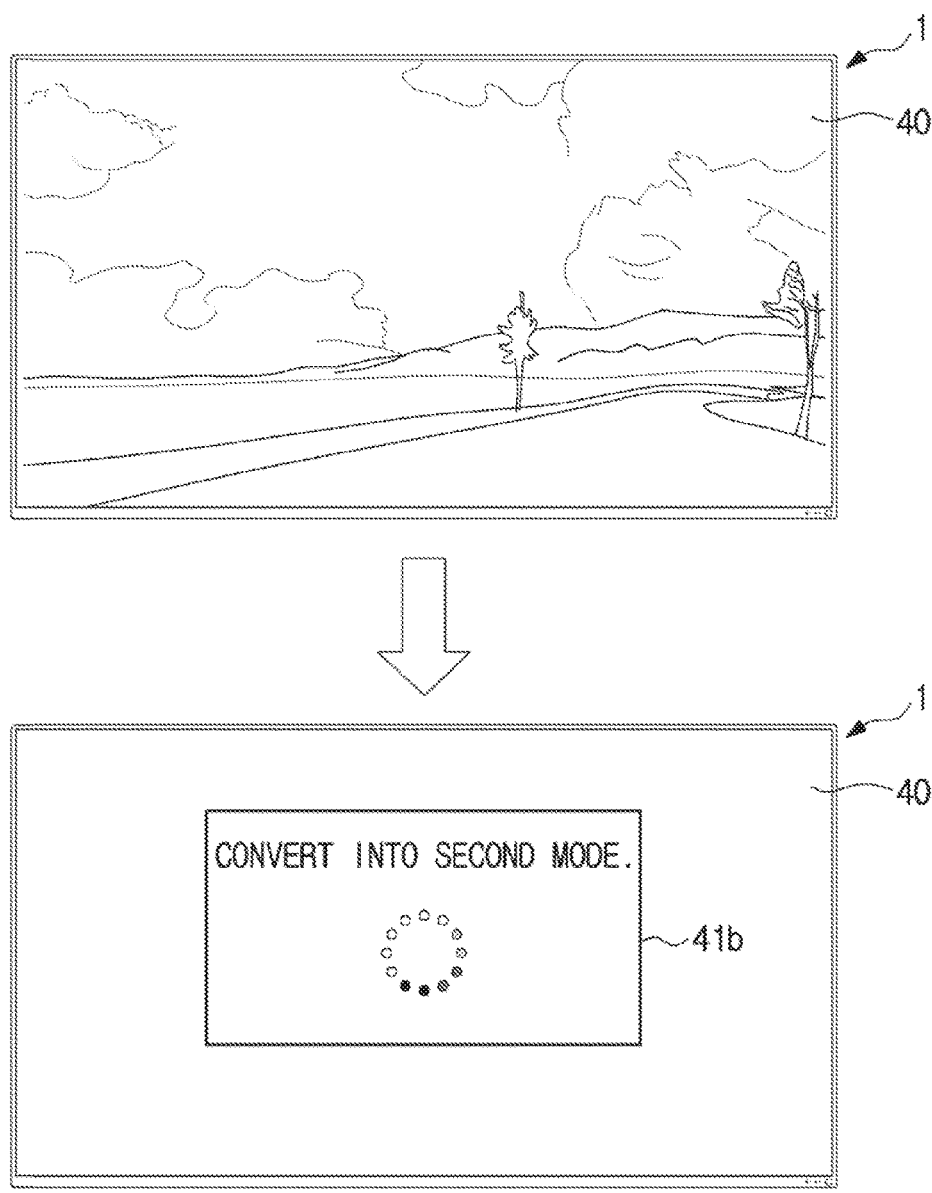

FIGS. 23 and 24 are views of an example of a screen displayed on a display apparatus to provide information related to a mode conversion.

As mentioned above, the controller 300 may determine an image output mode of the display apparatus 1 based on whether the first signal transmission device 100 or the second signal transmission device 200 is connected to the display apparatus 1.

A mode conversion may be automatically performed according to the determined image output mode and thus information related to a mode conversion may be provided to a user, as illustrated in FIGS. 23 and 24.

Referring to FIG. 23, when the output terminal 121 of the first signal transmission device 100 is inserted into the first input terminal 21a during a broadcasting mode in which the display apparatus 1 outputs a broadcast signal that is received via an antenna, the controller 300 may recognize as an input of a composite signal and then activate the first mode.

In this case, as illustrated in FIG. 23, by displaying a screen 41a indicating that the display unit 40 is converted into the first mode, information related to the mode conversion may be provided to a user.

A broadcast screen that is previously displayed may be displayed or not displayed on a background of the screen 41a until a composite image that is transmitted from the external device 2 is output on the display unit 40 since an output mode is converted.

By watching the screen 41a indicating that the mode is converted into the first mode, the user may confirm whether the signal transmission device 100 is appropriately connected or not.

Referring to FIG. 24, during the display apparatus 1 is in the broadcasting mode in which the display apparatus 1 outputs a broadcast signal that is received via the antenna, when the first output terminal 121 of the first signal transmission device 100 is inserted into the first input terminal 21a and when the second output terminal 221 of the second signal transmission device 200 is inserted into the second input terminal 21b, the controller 300 may recognize as an input of a component signal and then activate the second mode.

In this case, as illustrated in FIG. 24, by displaying a screen 41b indicating that the display unit 40 is converted into the second mode, information related to the mode conversion may be provided to a user.

Until a component image that is transmitted from the external device 3 is output on the display unit 40 since an image output mode is converted, a broadcast screen that is previously displayed may be displayed or another screen may be displayed on the background of the screen 41a.

By watching the screen 41b indicating that the mode is converted into the second mode, the user may confirm whether the signal transmission device 100 and 200 is appropriately connected.

Figure 25:
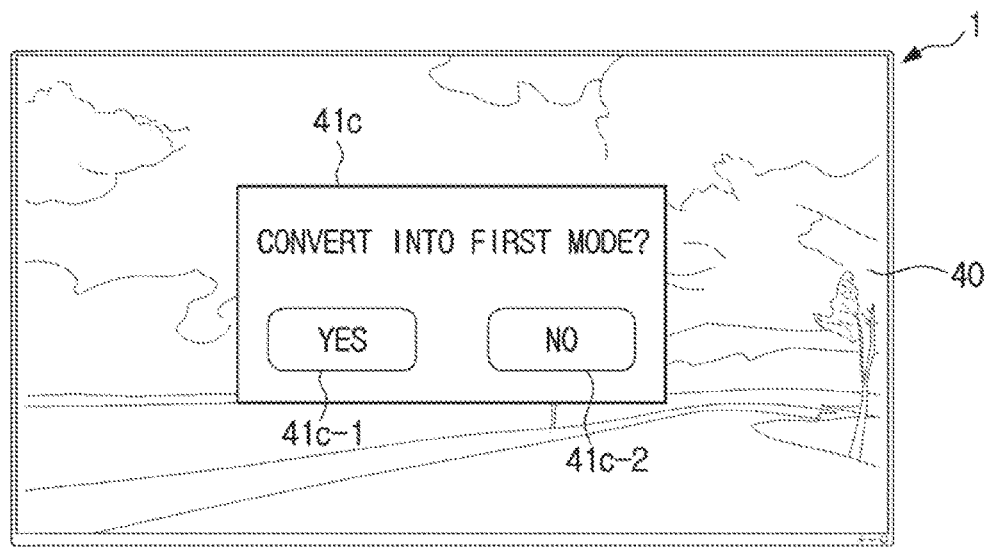
FIGS. 25 and 26 are views of an example of a screen displayed on a display apparatus to receive an input of a selection of a user related to a mode conversion, according to an exemplary embodiment.
Figure 26:
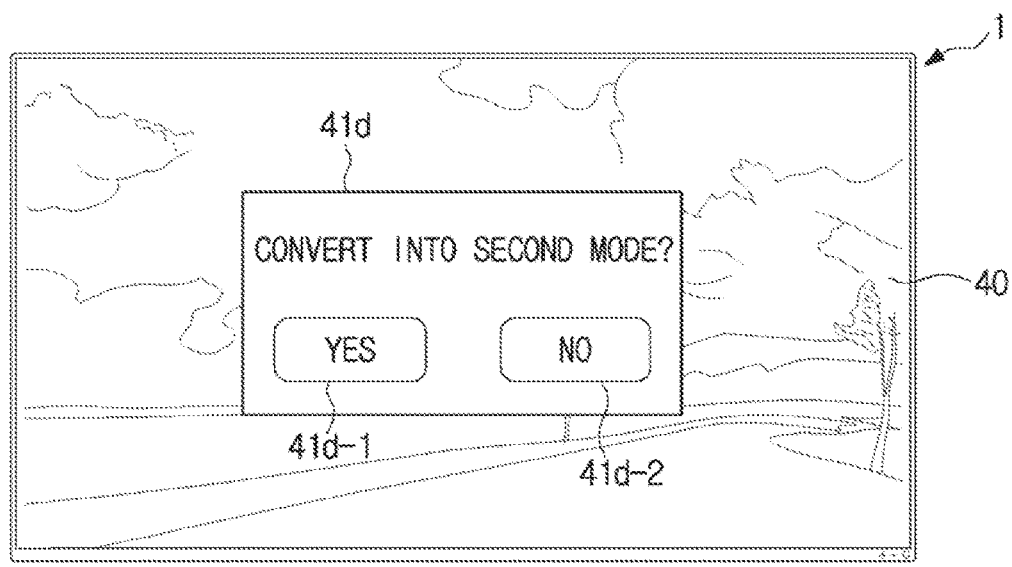

FIGS. 25 and 26 are views of an example of a screen displayed on a display apparatus to receive an input of a selection of a user related to a mode conversion.

The display apparatus 1 may convert an image output mode according to a user's selection as well as automatically convert an image output mode as mentioned above.

Referring to FIG. 25, when the output terminal 121 of the first signal transmission device 100 is inserted into the first input terminal 21a during a broadcasting mode in which the display apparatus 1 outputs a broadcast signal that is received via an antenna, the controller 300 may determine an image output mode as the first mode. However, the controller 300 may not promptly convert the image output mode into the first mode, but the controller 300 may display a screen 41c guiding a user's selection about whether to convert the mode into the first mode on the display unit 40.

The user may select a "yes" button 41c-1 or a "no" button 41c-2 by operating the input unit (71, 72), and when the "yes" button 41c-1 is selected, the controller 300 may convert an image output mode of the display apparatus 1 into the first mode and when the "no" button 41c-2 is selected, the controller 300 may maintain an image output mode of the display apparatus 1 as a previous mode.

As illustrated in FIG. 26, during a broadcasting mode in which the display apparatus 1 outputs a broadcast signal that is received via an antenna, when the first output terminal 121 of the first signal transmission device 100 is inserted into the first input terminal 21a and the second output terminal 221 of the second signal transmission device 200 is inserted into the second input terminal 21b, the controller 300 may determine an image output mode as the second mode. The controller 300 may display a screen 41d guiding a user's selection about whether the mode is converted into the second mode on the display unit 40.

The user may select a "yes" button 41d-1 or a "no" button 41d-2 by operating the input unit, and when the "yes" button 41d-1 is selected, the controller 300 may convert an image output mode of the display apparatus 1 into the second mode and when the "no" button 41d-2 is selected, the controller 300 may maintain an image output mode of the display apparatus 1 as a previous mode.

FIGS. 27 to 30 are views of an example of a screen displayed on a display apparatus to guide a connection of a signal transmission device.

Referring to a table of FIG. 14 again, when the second signal transmission device 200 is connected to the display apparatus 1 and the first signal transmission device 100 is not connected to the display apparatus 1, one of three component signals for playing an image may not be input and thus the controller 300 may deactivate any image output mode between the first mode and the second mode.

In this case, the display unit 40 may guide the user to connect the first transmission device 100 by displaying a screen 41e, 41f, and 41g indicating that one of signal is not input.

Figure 27:
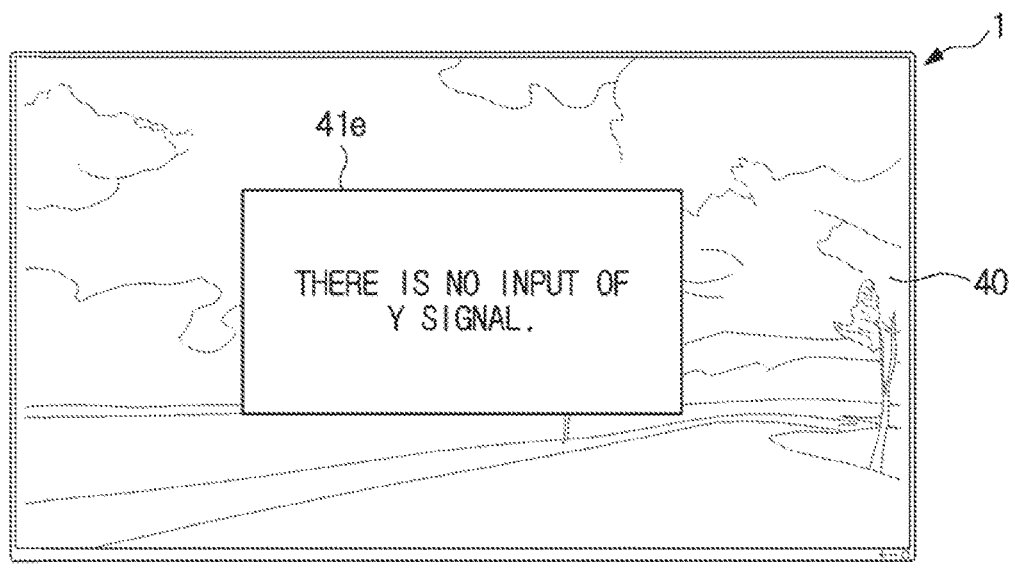
FIGS. 27 to 30 are views of an example of a screen displayed on a display apparatus to guide a connection of a signal transmission device, according to an exemplary embodiment.

When the second signal transmission device 200 transmits a blue color difference color (Pb) and a red color difference color (Pr) and the first signal transmission device 100 transmits a luminance signal (Y), the display unit 40 may display a screen 41e indicating that the luminance signal (Y) is not input, as illustrated in FIG. 27.

Figure 28:
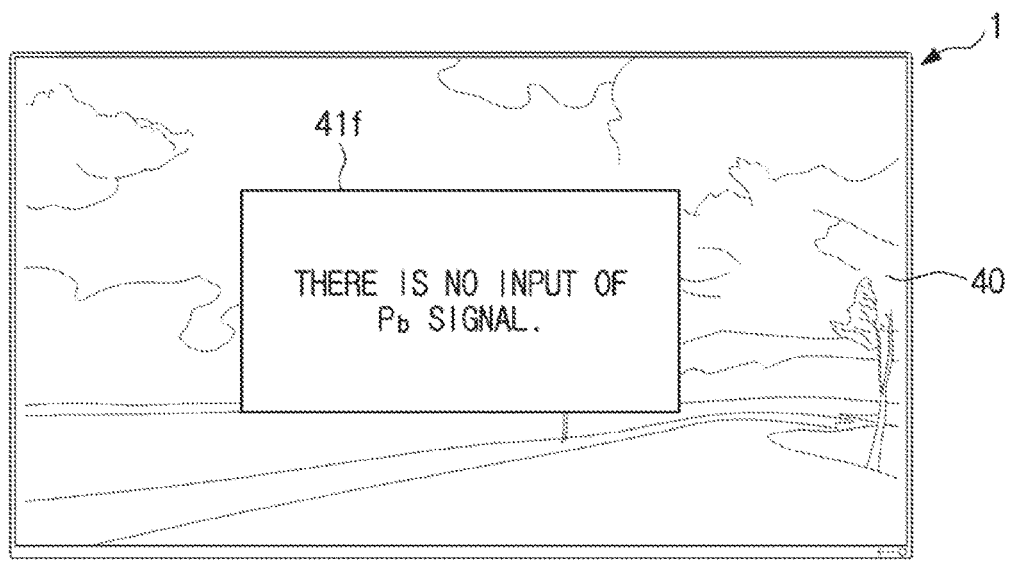

When the second signal transmission device 200 transmits a red color difference color (Pr) and a luminance signal (Y) and the first signal transmission device 100 transmits a blue color difference color (Pb), the display unit 40 may display a screen 41f indicating that the blue color difference color (Pb) is not input, as illustrated in FIG. 28.

Figure 29:
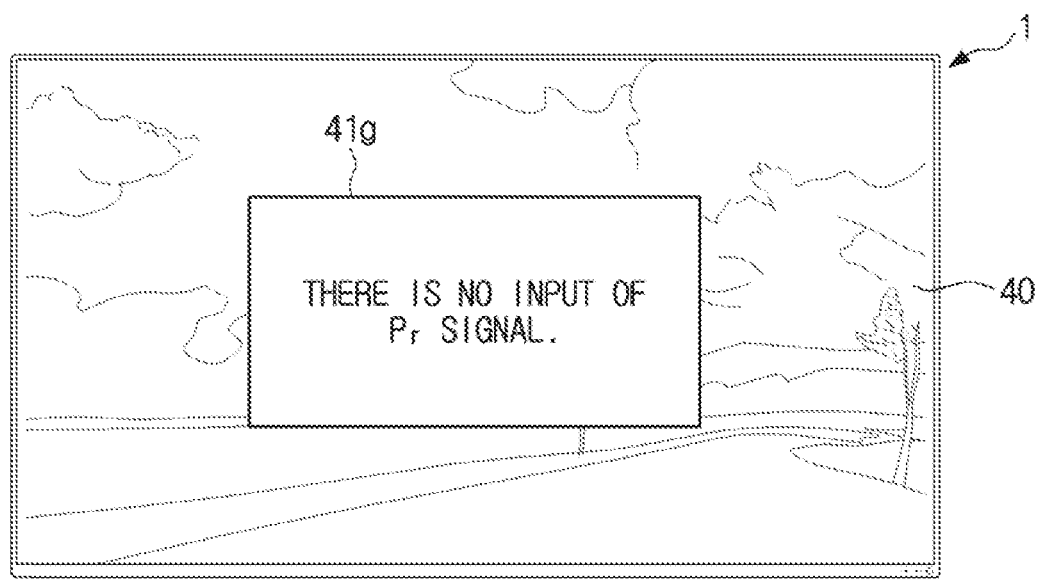

When the second signal transmission device 200 transmits a blue color difference color (Pb) and a luminance signal (Y) and the first signal transmission device 100 transmits a red color difference color (Pr), the display unit 40 may display a screen 41g indicating that the red color difference color (Pr) is not input, as illustrated in FIG. 29.

Figure 30:
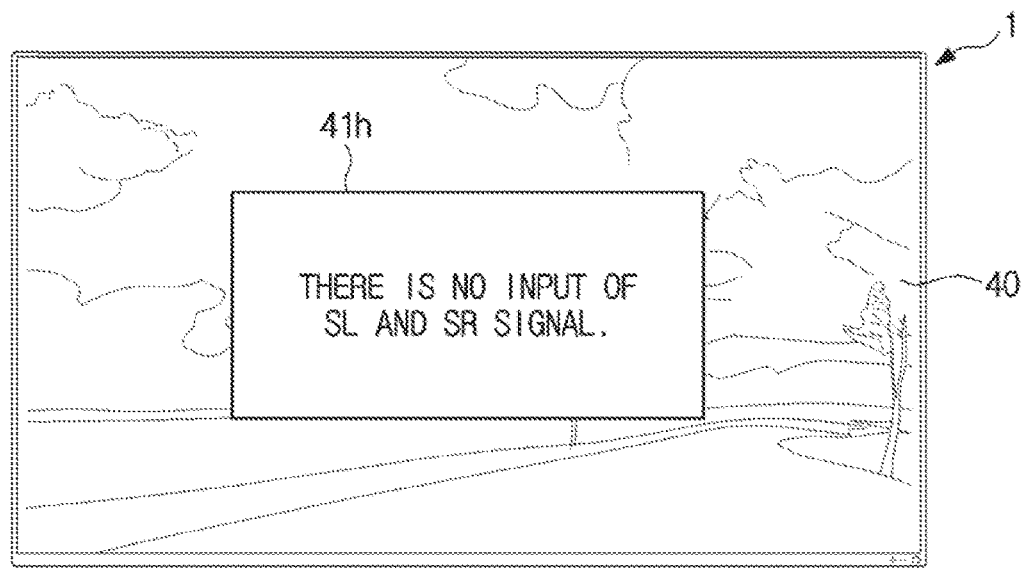

Because a sound signal is also transmitted via the first input terminal 21a, a sound signal may be not input when the first signal transmission device 100 is not connected. Therefore, as illustrated in FIG. 30, the display unit 40 may display a screen 41h indicating that a sound signal (SL and SR) is not input.

In the conventional manner, three cables transmitting three component signals are connected to the same output connector. However, in the signal transmission device 100 and 200 according to an exemplary embodiment, one of component signals and a composite signal may share one cable 130a while the remaining component signal is transmitted via the other signal transmission device 100.

Therefore, when the display unit 40 displays a screen to guide the connection of the first signal transmission device 100, the user may recognize that the connection of the first signal transmission device 100 is needed for the viewing of the content in the component method. Accordingly, a user is not used to connecting an external device to the display apparatus 1 may connect the external device to the display apparatus 1 by using the signal transmission device 100 and 200 appropriately so that the user may be allowed to view a variety of contents.

Figure 31:
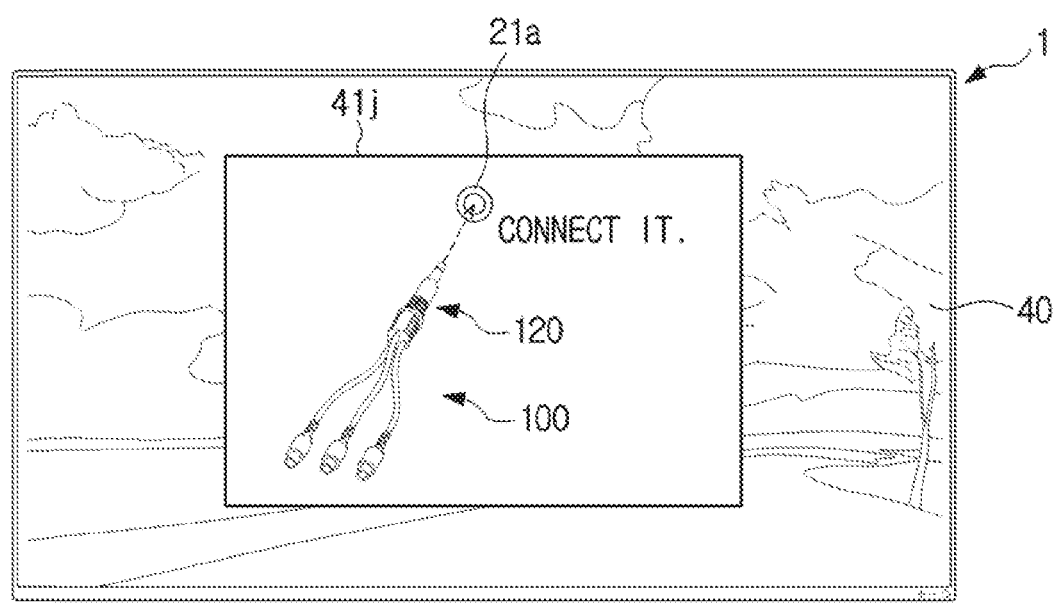
FIG. 31 is a view of another example of a screen displayed on a display apparatus to guide a connection of a signal transmission device, according to an exemplary embodiment.

FIG. 31 is a view of another example of a screen displayed on a display apparatus to guide a connection of a signal transmission device.

In the above-mentioned example of FIGS. 27 to 30, the connection of the signal transmission device is guided by providing information related to a signal that is not input, but an exemplary embodiment of the display apparatus 1 is not limited thereto. Accordingly, information related to the signal transmission device may be directly provided.

As illustrated in FIG. 31, the display unit 40 may guide the connection of the first signal transmission device 100 by displaying a screen 41j indicating an exterior of the first signal transmission device 100.

The screen 41j indicating the exterior of the first signal transmission device 100 may provide information related to the number of the cable 130a, 130b, and 130c, the number of the input connector 110a, 110b, and 110c, the number of the output connector 120, and the color of the connector of the first signal transmission device 100. Therefore, the user may intuitively recognize which signal transmission device needs a connection by watching the screen 41j displayed on the display unit 40.

Figure 32:
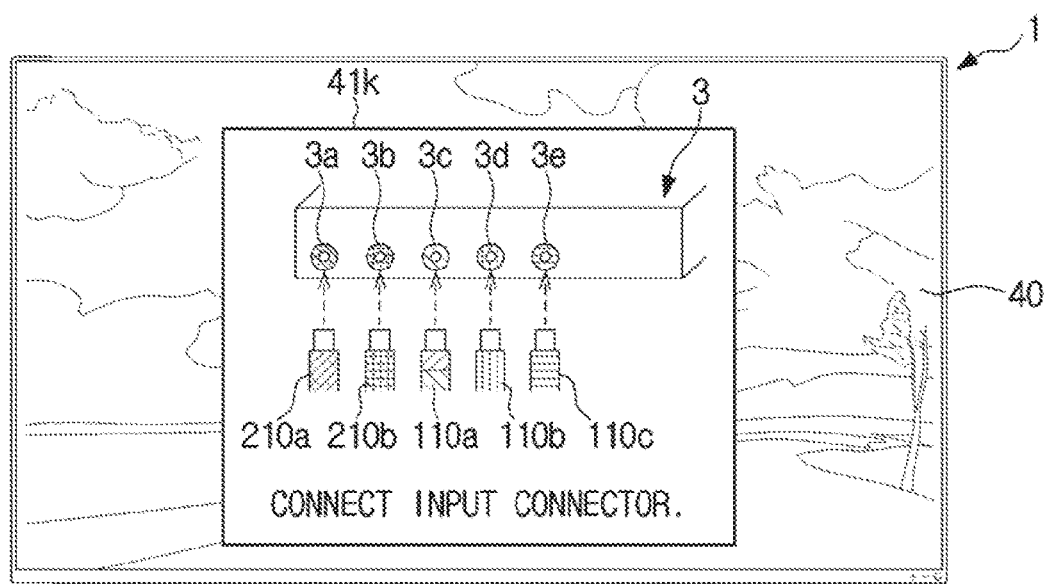
FIGS. 32 and 33 are views of an example of a screen displayed on a display apparatus to guide a connection between a signal transmission device and an external device, according to an exemplary embodiment.
Figure 33:
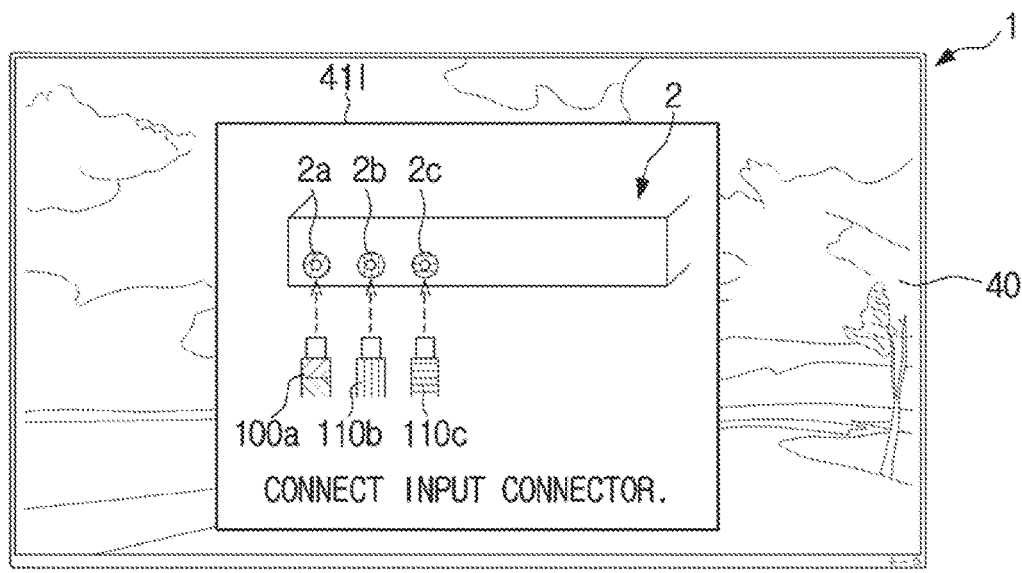

FIGS. 32 and 33 are views of an example of a screen displayed on a display apparatus to guide a connection between a signal transmission device and an external device.

For example, when the output terminal 121 of the first signal transmission device 100 is inserted into the first input terminal 21a of the display apparatus 1 and the output terminal 221 of the second signal transmission device 200 is inserted into the second input terminal 21b of the display apparatus 1, the display unit 40 may display a screen 41k to guide the input connector 110a, 110b, and 110c of the first signal transmission device 100 and the input connector 210a and 210b of the second signal transmission device 200 to be connected to the output terminal 3a, 3b, 3c, 3d, and 3e of the second external device 3 corresponding to the input connector 110a, 110b, and 110c of the first signal transmission device 100 and the input connector 210a and 210b of the second signal transmission device 200, respectively, as illustrated in FIG. 32. It may include a connection via an additional cable.

For another example, when the first output terminal 121 of the first signal transmission device 100 is inserted into the first input terminal 21a of the display apparatus 1 and the second output terminal 221 of the second signal transmission device 200 is not inserted into the second input terminal 21b of the display apparatus 1, the display unit 40 may display a screen 41l to guide the input connector 110a, 110b, and 110c of the first signal transmission device 100 to be connected to the output terminal 2a, 2b and 2c of the second external device 3 corresponding to the input connector 110a, 110b, and 110c of the first signal transmission device 100, respectively, as illustrated in FIG. 33.

Figure 34:
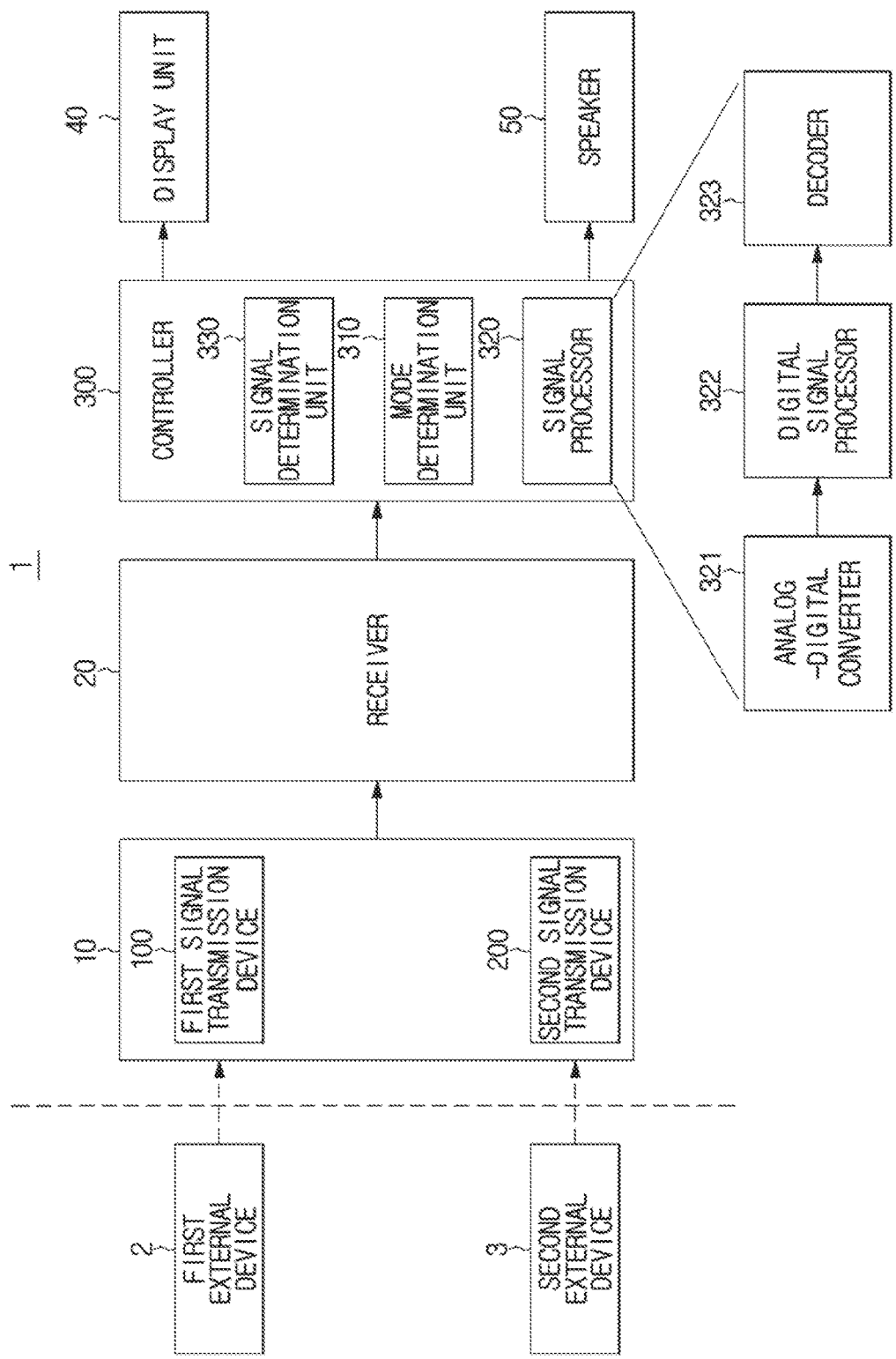
FIG. 34 is a control block diagram illustrating of a controller of a display apparatus according to an exemplary embodiment.
Figure 35:
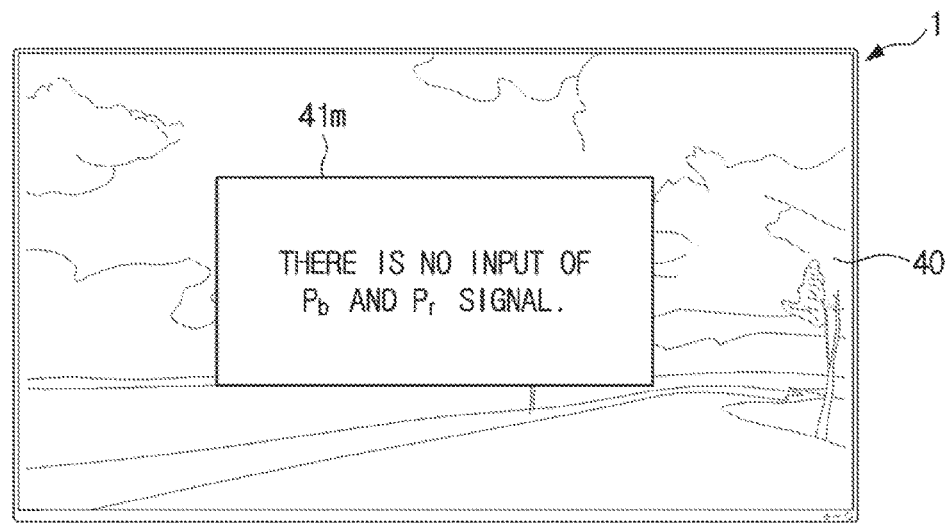
FIGS. 35 and 36 are views of an example of a screen to guide a connection of a signal transmission device, according to an exemplary embodiment.
Figure 36:
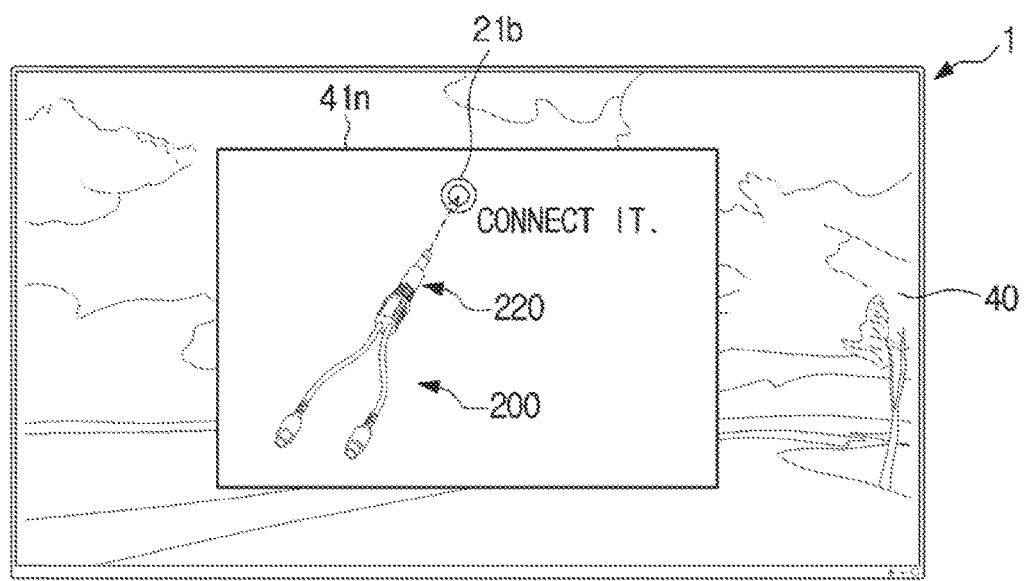

FIG. 34 is a control block diagram illustrating of a controller of a display apparatus according to an exemplary embodiment, and FIGS. 35 and 36 are views of an example of a screen to guide a connection of a signal transmission device.

Referring to FIG. 34, the controller 300 may further include a signal identification unit 330 configured to identify a format of a signal, which is input after an image output mode is determined based on whether the first input terminal 21a and the second input terminal 21b are connected to the signal transmission device 100 and 200.

For example, when the first signal transmission device 100 is connected to the first input terminal 21a and the second signal transmission device 200 is not connected to the second input terminal 21b, the mode determination unit 310 may determine an image output mode as the first mode outputting a composite image.

However, in practice, the first signal transmission device 100 may be connected to the second external device 3 outputting a component signal without being connected to the first external device 2 outputting a composite signal.

In this case, because one of three component signals is input to the signal processor 320, when the signal processor 320 processes the input signal without a change and displays the processed signal on the display unit 40, an image without the color difference information or without the luminance information may be displayed on the display unit 40.

Therefore, the signal identification unit 330 may identify a signal, which is output from the second external device 3 and transmitted via the first signal transmission device 100, as a component signal, and the mode determination unit 310 may re-determine an image output mode as the second mode, in which the second signal transmission device 200 is not connected, not the first mode.

In this case, the display unit 40 may display a screen 41m and 41n to guide a connection of the second signal transmission device 200, as illustrated in FIGS. 35 and 36.

When the first signal transmission device 100 transmits a luminance signal (Y) among the component signal, the display unit 40 may display a screen 41m indicating that a blue color difference signal (Pb) and a red color difference signal (Pr) are not input by displaying text, as illustrated in FIG. 35 and the display unit 40 may display a screen 41n indicating an exterior of the second signal transmission device 200 to allow a user to intuitively recognize which signal transmission device needs a connection, as illustrated in FIG. 36.

In addition to the above-mentioned case, the mode determination unit 310 may determine a case in which a mode, which is determined based on whether the input terminal 21a and 21b are connected to the signal transmission device 100 and 200, does not correspond to a format of a signal that is practically input, and the display unit 40 may display a screen to guide a connection of the signal transmission device 10 so that an image output mode of the display apparatus 1 corresponds to an input signal.

For example, in a case in which the first signal transmission device 100 is connected to the first external device 2 not the second external device 3 in practice, although an output mode is determined to be the second mode because the first signal transmission device 100 and the second signal transmission device 200 are connected to the first input terminal 21a and the second input terminal 21b, respectively, when the signal identification unit 330 identifies a composite signal among an input signal, the mode determination unit 310 may determine that a determined second mode does not correspond to the composite signal and the display unit 40 may display a screen to guide the first signal transmission device 100 to be connected to the second external device 3 and not the first external device 2.

Below, an exemplary embodiment of a control method of a display apparatus will be described. The control method of the display apparatus may be applied to the above-mentioned display apparatus 1 and the signal transmission device 100 and 200 included in the display apparatus 1. Therefore, the above-mentioned description of FIGS. 1 to 36 may be applied to the control method of the display apparatus.

Below, for convenience of description, the second signal transmission device 200 transmits two components signal among three component signals and the first signal transmission device 100 transmits the remaining one component signal or a composite signal and a sound signal.

Figure 37:
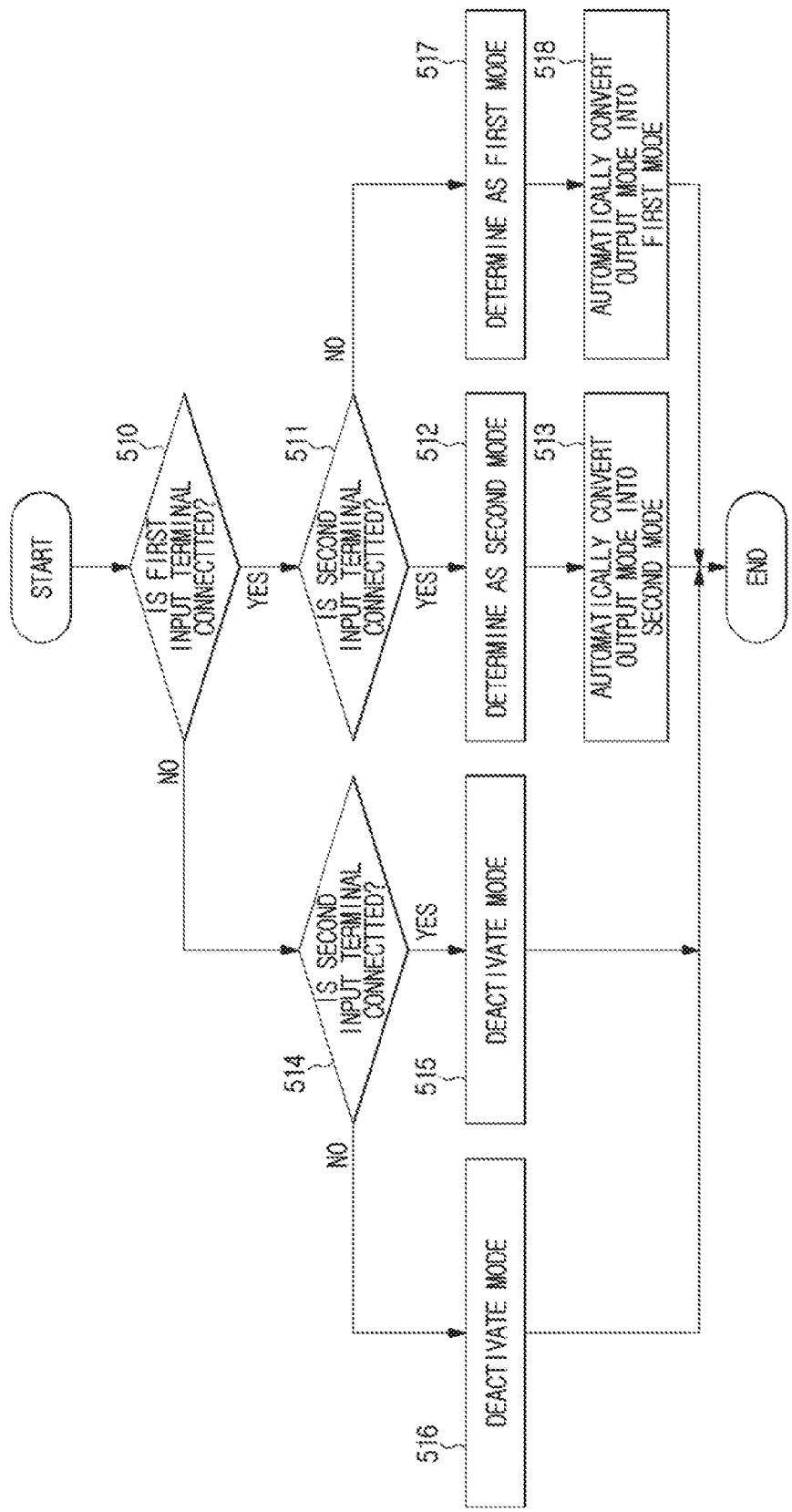
FIG. 37 is a flow chart of an example of automatically converting an output mode in a control method of a display apparatus according to an exemplary embodiment.

FIG. 37 is a flow chart of an example of automatically converting an output mode in a control method of a display apparatus according to an exemplary embodiment.

Referring to FIG. 37, when the first signal transmission device 100 is connected to the first input terminal 21a (YES of 510) and the second signal transmission device 200 is connected to the second input terminal 21b (YES of 511), the controller 300 may recognize it as an input of a component signal and then determine an image output mode, which is then converted, as the second mode (512).

An image output mode of the display apparatus 1 may include a first mode and a second mode wherein the first mode may be a mode configured to output an image signal provided in a composite method to the display unit 40, and the second mode may be a mode configured to output an image signal provided in a component method to the display unit 40.

The controller 300 may automatically convert an image output mode of the display apparatus 1 into the second mode (513). For example, during the display apparatus 1 is in the third mode (e.g., broadcasting mode) in which a broadcast signal that is received from the broadcast station is output, when the controller 300 recognizes the connection of the first input terminal 21a and the second input terminal 21b and then determine to convert an image output mode into the second mode, the display apparatus 1 may be automatically converted from the third mode into the second mode. That is, although there is no an additional input from a user to select an image output mode, an image output mode may be automatically converted when the signal transmission device 100 and 200 is connected to the input terminal 21a and 21b, respectively.

In addition, when the first signal transmission device 100 is connected to the first input terminal 21a (YES of 510) and the second signal transmission device 200 is not connected to the second input terminal 21b (NO of 511), the controller 300 may recognize it as an input of a composite signal and then determine an image output mode as the first mode (517).

The controller 300 may automatically convert an image output mode of the display apparatus 1 into the first mode (518).

When the first signal transmission device 100 is not connected to the first input terminal 21a (NO of 510) and the second signal transmission device 200 is connected to the second input terminal 21b (YES of 514), the controller 300 may recognize that one of component signal is not input and then deactivate the mode (515). Deactivation of the mode may represent deactivating both of the first mode and the second mode outputting an image that is received from the external devices 2 and 3.

When neither of the first input terminal 21a nor the second input terminal 21b are connected to the first signal transmission device 100 and the second signal transmission device 200, respectively (NO of 510 and NO of 514), the controller 300 may recognize that there is no input signal from the external devices 2 and 3 and then deactivate the mode (516)

According to an exemplary embodiment, the controller 300 may automatically convert an image output mode of the display apparatus 1 into the first mode or the second mode. As illustrated in FIGS. 23 and 24, during the mode is converted, the controller 300 may display the screen 41a and 41b guiding the conversion of the mode on the display unit 40.

Figure 38:
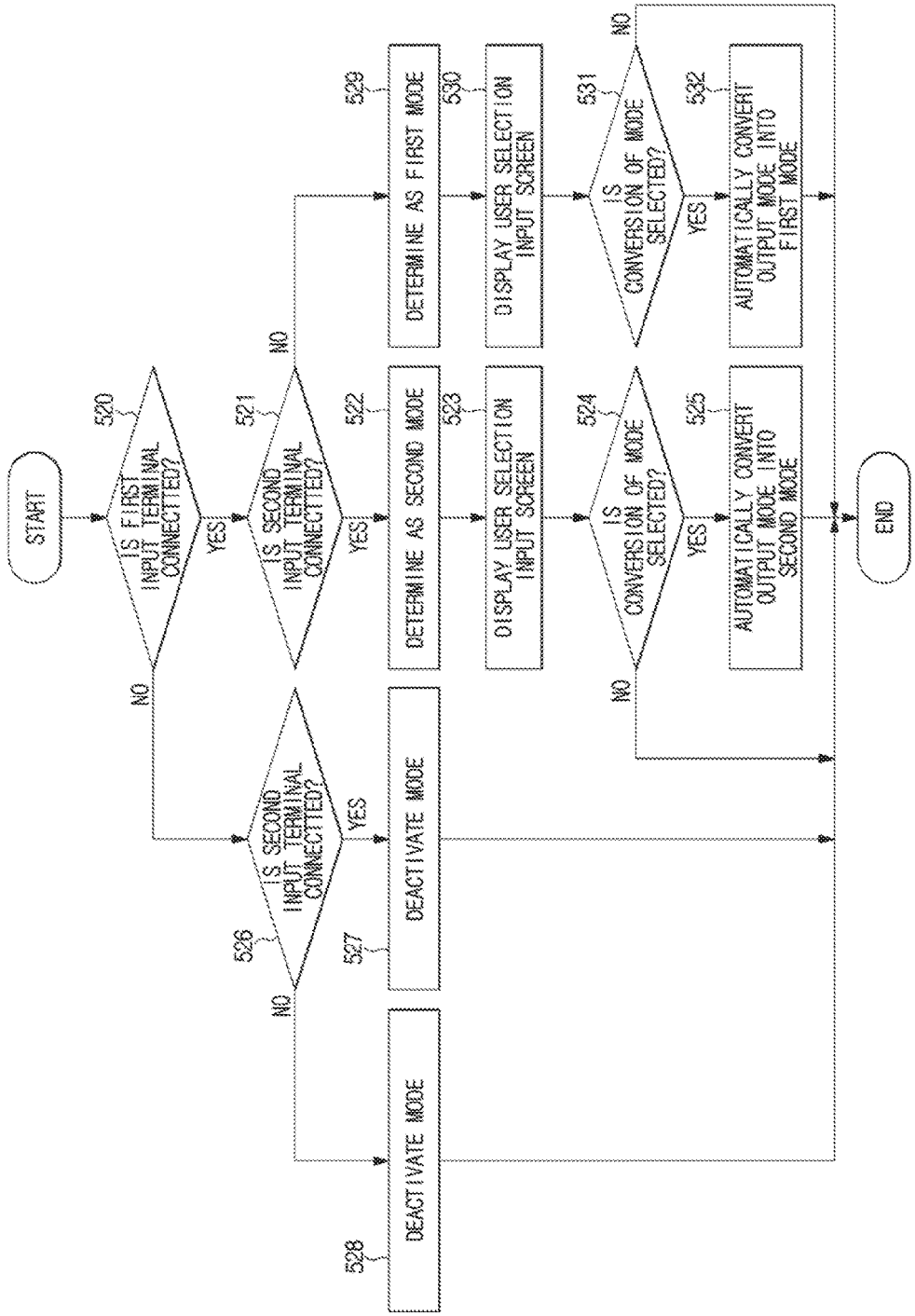
FIG. 38 is a flow chart of an example of receiving an input of a selection related to a conversion of a mode from a user in a control method of a display apparatus, according to an exemplary embodiment.

FIG. 38 is a flow chart of an example of receiving an input of a selection related to a conversion of a mode from a user in a control method of a display apparatus according to an exemplary embodiment.

Referring to FIG. 38, when the first signal transmission device 100 is connected to the first input terminal 21a (YES of 520) and the second signal transmission device 200 is connected to the second input terminal 21b (YES of 521), the controller 300 may recognize as an input of a component signal and then determine an image output mode as the second mode (522).

In this case, the controller 300 may not promptly convert an image output mode but may display a user selection input screen configured to receive an input of selection related to the conversion of the mode from a user (523), and when the mode conversion is selected by the user (524) the controller 300 may convert an output mode into the second mode (525).

For example, as illustrated in FIG. 26, the controller 300 may display the screen 41d asking whether to convert into the second mode on the display unit 40, and the user may input a selection related to the conversion of the mode by selecting a "yes" button 41d-1 or a "no" button 41d-2 both of which are displayed on the screen 41d. When the "yes" button 41d-1 is selected, the controller 300 may convert an image output mode into the second mode (525)

When the first signal transmission device 100 is connected to the first input terminal 21a (YES of 520) and the second signal transmission device 200 is not connected to the second input terminal 21b (NO of 521), the controller 300 may recognize as an input of a composite signal and then determine an image output mode as the first mode (529).

In this case, the controller 300 may not promptly convert an image output mode but may display a user selection input screen configured to receive an input selection related to conversion of mode from a user (530), and when the mode conversion is selected by the user (531), the controller 300 may covert an output mode into the first mode (532).

For example, as illustrated in FIG. 25, the controller 300 may display the screen 41c asking whether to convert into the first mode on the display unit 40, and the user may input a selection related to the conversion of the mode by selecting a "yes" button 41c-1 or a "no" button 41c-2 both of are displayed on the screen 41c. When the "yes" button 41c-1 is selected, the controller 300 may convert an image output mode into the first mode (532).

When the first signal transmission device 100 is not connected to the first input terminal 21a (NO of 520) and the second signal transmission device 200 is connected to the second input terminal 21b (YES of 526), the controller 300 may recognize that one of component signals is not input, and then deactivate the mode (527).

When neither of the first input terminal 21a nor the second input terminal 21b are connected to the first signal transmission device 100 and the second signal transmission device 200, respectively (NO of 520 and NO of 526), the controller 300 may recognize that there is no input signal from the external devices 2 and 3 and then deactivate the mode (528).

Figure 39:
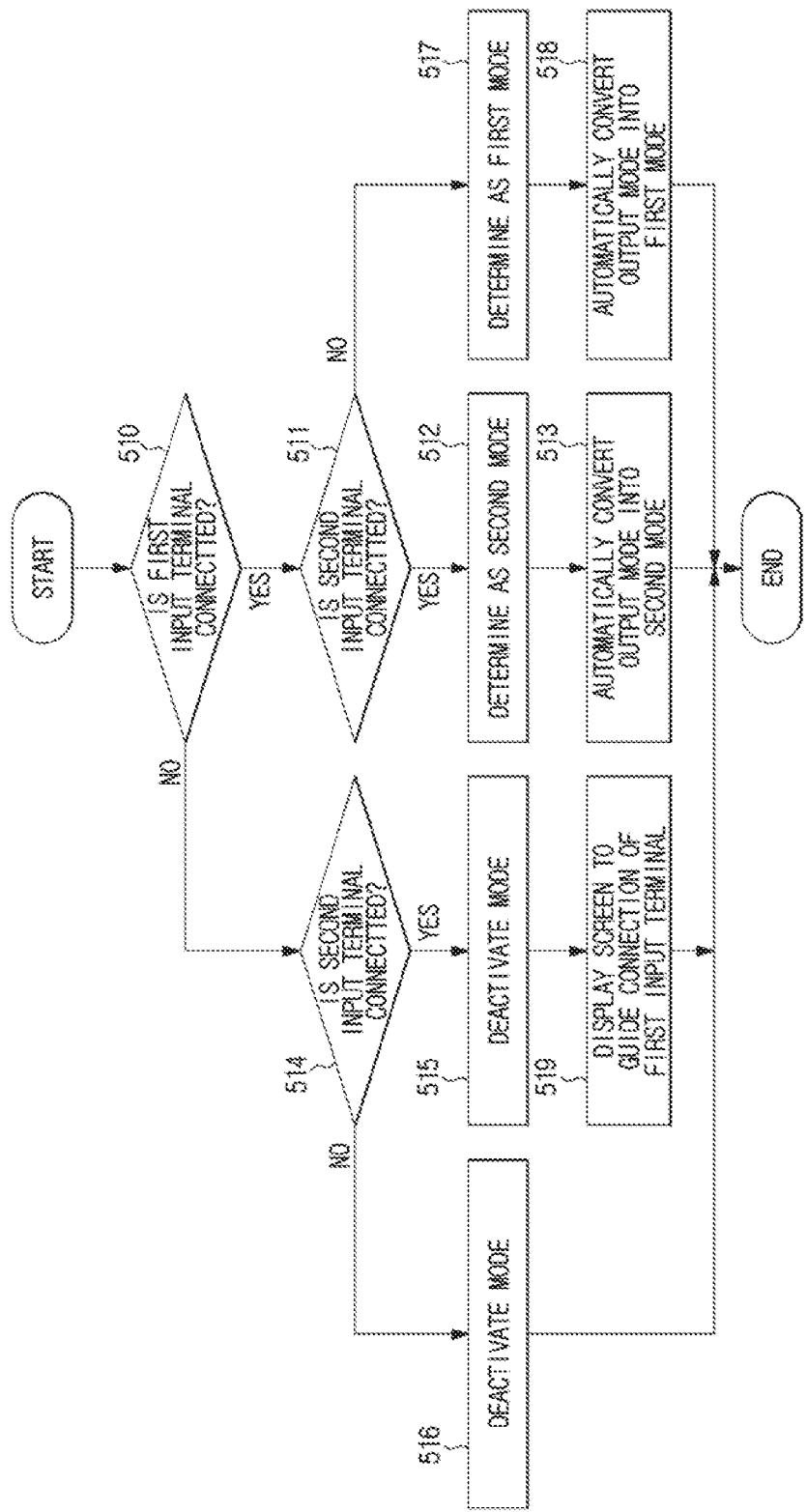
FIG. 39 is a flow chart of an example of receiving an input of a selection related to a conversion of a mode from a user in a control method of a display apparatus, according to an exemplary embodiment.

FIG. 39 is a flow chart of an example of receiving an input of a selection related to a conversion of a mode from a user in a control method of a display apparatus according to an exemplary embodiment. A description of the same parts as those shown in FIG. 37 may not be described below.

Referring to FIG. 39, when the first signal transmission device 100 is not connected to the first input terminal 21a (NO of 510) and the second signal transmission device 200 is connected to the second input terminal 21b (YES of 514), the controller 300 may display a screen to guide a connection of the first input terminal without promptly determining to deactivate the mode and completing the mode (519).

For example, when a component signal transmitted via the first signal transmission device 100 is a luminance signal (Y), the controller 300 may display the screen 41e indicating that there is no input of the luminance signal (Y), as illustrated in FIG. 27; when a component signal transmitted via the first signal transmission device 100 is a blue color difference signal (Pb), the controller 300 may display the screen 41f indicating that there is no input of the blue color difference signal (Pb), as illustrated in FIG. 28; and when a component signal transmitted via the first signal transmission device 100 is a red color difference signal (Pr), the controller 300 may display the screen 41g indicating that there is no input of the red color difference signal (Pr), as illustrated in FIG. 29.

The controller 300 may display the screen 41h indicating that there is no input of a sound signal (SL and SR), as illustrated in FIG. 30, and the controller 300 may provide information related to the signal transmission device that may be needed to be connected by displaying the screen 41j directly indicating an exterior of the first signal transmission device 100, as illustrated in FIG. 31.

When the first input terminal is connected after the screen to guide the connection of the first input terminal is displayed, the controller 300 may determine an output mode as the second mode and then automatically convert the mode.

According to an exemplary embodiment, a case in which an output mode is automatically converted is described, but a selection related to the conversion of the mode may be input from a user, as illustrated in FIG. 38.

Figure 40:
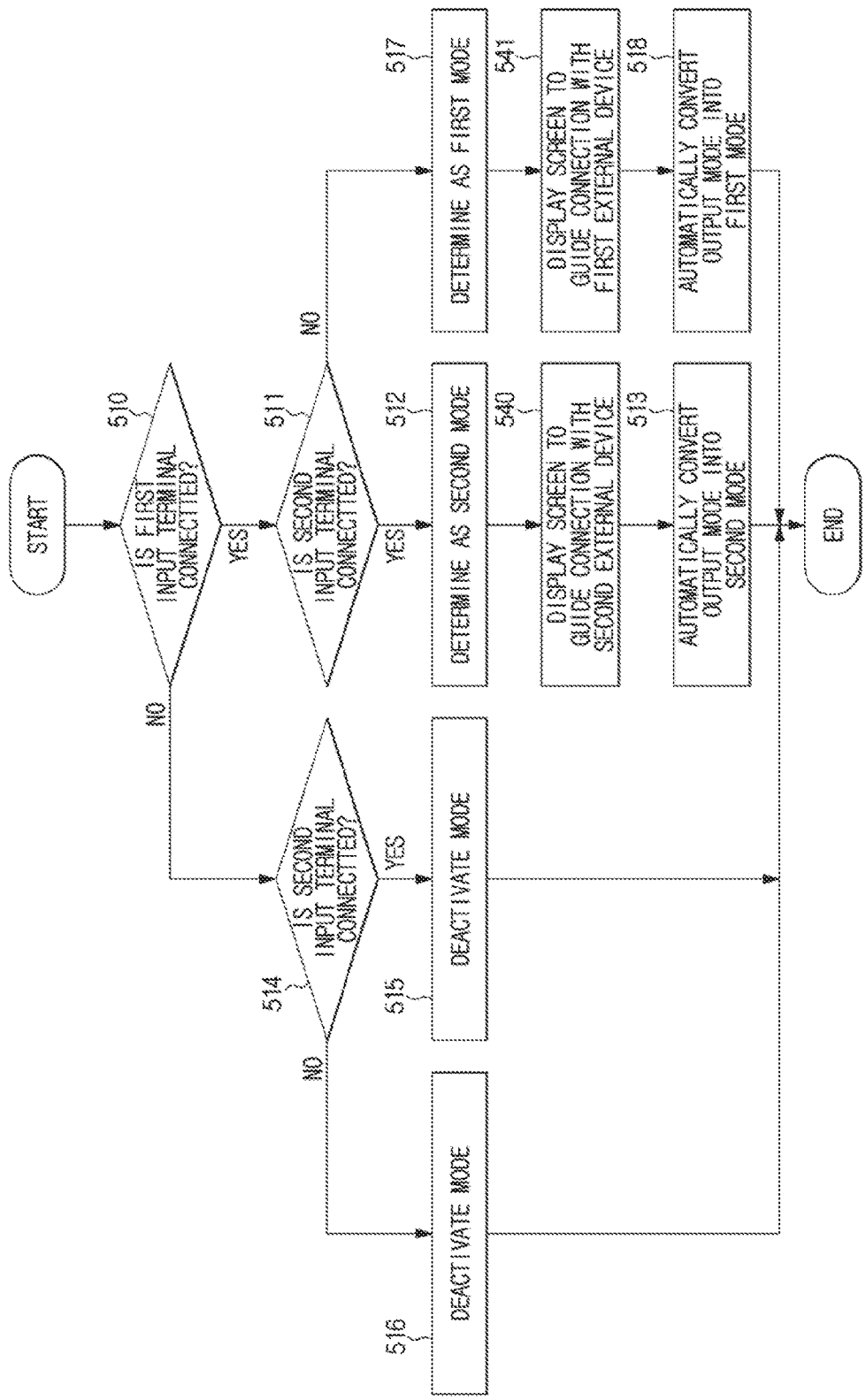
FIG. 40 is a flow chart of an example of displaying a screen guiding a connection between an external device and a signal transmission device in a control method of a display apparatus, according to an exemplary embodiment.

FIG. 40 is a flow chart of an example of displaying a screen guiding a connection between an external device and a signal transmission device in a control method of a display apparatus according to an exemplary embodiment.

When the first signal transmission device 100 is connected to the first input terminal 21a (YES of 510) and the second signal transmission device 200 is connected to the second input terminal 21b (YES of 511), the controller 300 may recognize as an input of a component signal and then determine an image output mode as the second mode (512).

A user who does not get used to using of a cable may feel a difficulty in connecting a plurality of input connectors to the second external device. Therefore, the display unit 40 may display a screen to guide a connection with the second external device (540).

For example, as illustrated in FIG. 32, the controller 300 may intuitively guide the connection between the signal transmission device 100 and 200 and the external devices 2 and 3 by displaying the screen 41k indicating that the connection between the output terminal 3a, 3b, 3c, 3d, and 3e of the external device 3, and the input connector 110a, 110b, and 110c of the first signal transmission device 100 and the input connector 210a and 210b of the second signal transmission device 200 in an image manner.

When the first signal transmission device 100 is connected to the first input terminal 21a (YES of 510) and the second signal transmission device 200 is not connected to the second input terminal 21b (NO of 511), the controller 300 may recognize as an input of a composite signal and then determine an image output mode as the first mode (517).

In this case, the controller 300 may display the screen to guide a connection with the first external device 2 (541).

For example, as illustrated in FIG. 33, the controller 300 may intuitively guide the connection between the signal transmission device 100 and the external device 2 by displaying the screen 41l indicating that the connection between the output terminal 2a, 2b and 2c of the external device 2, and the input connector 110a, 110b, and 110c of the first signal transmission device 100 in an image manner.

Figure 41:
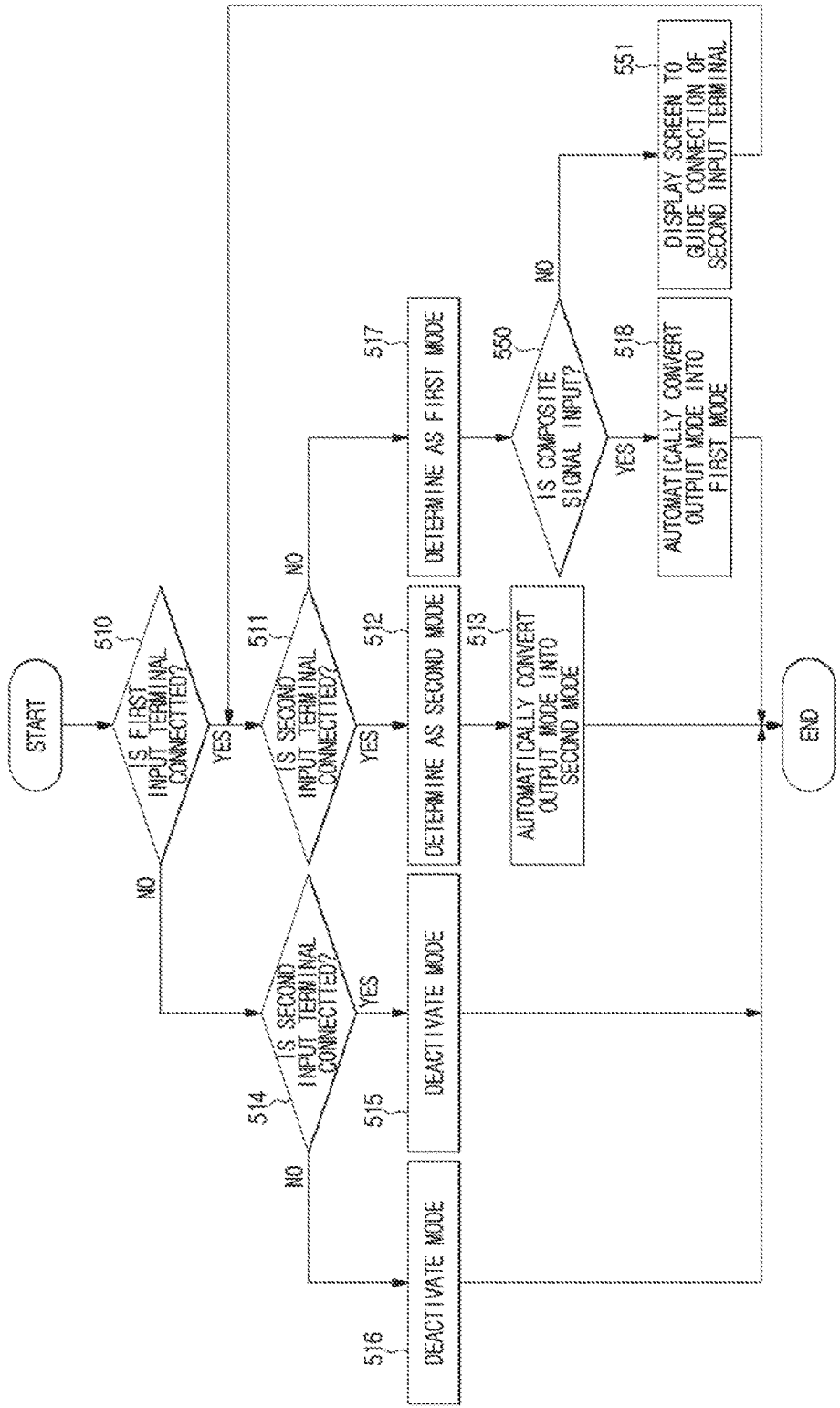
FIGS. 41 and 42 are flow charts of an example of identifying a signal that is practically input from an external device in a control method of a display apparatus, according to an exemplary embodiment.
Figure 42:
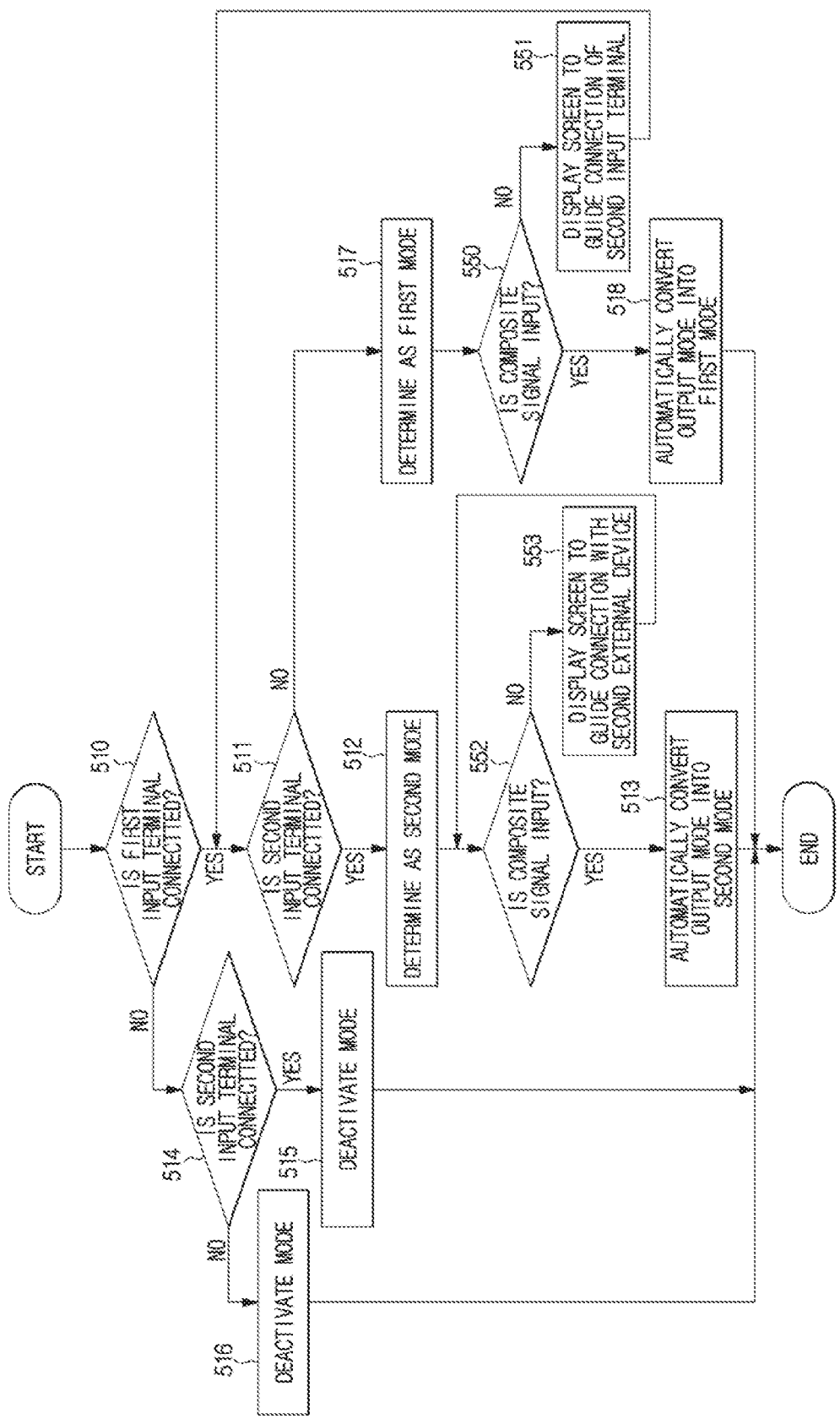

FIGS. 41 and 42 are flow charts of an example of identifying a signal that is practically input from an external device in a control method of a display apparatus according to an exemplary embodiment. A description of the same parts as those shown in FIG. 37 will be omitted.

Referring to FIG. 41, when the controller 300 determines an image output mode as the first mode (517) because the first signal transmission device 100 is connected to the first input terminal 21a (YES of 510) and the second signal transmission device 200 is not connected to the second input terminal 21b (NO of 511), the controller 300 may identify a format of a signal that is input from the external device.

When an input signal is a composite signal (YES of 550), the controller 300 may automatically convert an image output mode into the first mode (518), and when an input signal is not a composite signal (NO of 550), it may be that the first signal transmission device 100 is connected to the second external device 3 outputting a component signal not the first external device 2 outputting a composite signal.

Therefore, the controller 300 may determine that the input signal does not correspond to the first mode and may re-determine an image output mode as the second mode in which the second signal transmission device 200 is not connected. The display unit 40 may display the screen to guide a connection of the second input terminal (551).

For example, as illustrated in FIGS. 35 to 36, the display unit 40 may display the screen 41m and 41n to guide the connection of the second signal transmission device 200.

Referring to FIG. 42, although the controller 300 determines an output mode as the second mode (512) because the first signal transmission device 100 is connected to the first input terminal 21a (YES of 510) and the second signal transmission device 200 is connected to the second input terminal 21b (YES of 511), the controller 300 may identify a format of a signal that is input.

When a composite signal is not included in the input signal (NO of 552), the controller 300 may determine that the determined second mode does not correspond to the composite signal, and the display unit 40 may display the screen to guide a connection of the first signal transmission device 100 in which the first signal transmission device 100 is connected to the second external device 3 not the first external device 2 (553).

In the above-described FIGS. 40 to 42, a case in which an output mode is automatically converted is described, but it may be possible that a selection related to the conversion of the mode is input from a user, as illustrated in FIG. 39.

According to an exemplary embodiment, the display apparatus and the control method of the same, by transmitting one of component signals and one composite signal via a single cable, a volume and complexity of an exterior of a signal transmission device connected to the display apparatus may be reduced.

In addition, by determining and activating an output mode automatically based on whether the input terminal is connected to the signal transmission device, an output, which is appropriate for the connection state of the signal transmission device, may be implemented, and thus it may be prevented that an image is output and an sound is not output and a content that is appropriate for a user's intension may be output.

As is apparent from the above description, according to an exemplary display apparatus and control method of the same, by integrating two cables transmitting image signals that are different from each other, the miniaturization and the simplification of the display apparatus may be achieved. In addition, by automatically determining which method of image signal is input and then converting into a mode corresponding to the input signal, it may be prevented that only image is output or only sound is output, and a mode conversion that is appropriate to a user's intention may be performed.

Although one or more exemplary embodiments have been shown and described, it should be appreciated by those skilled in the art that changes may be made in the exemplary embodiments without departing from the principles and spirit of the present disclosure, the scope of which is defined in the claims and their equivalents.

What is claimed is:

1. A display apparatus comprising:
   a first signal transmission device comprising:
      a first video cable configured to selectively transmit a first image signal transmitted by a first method and a second image signal transmitted by a second method;
      an audio cable configured to transmit a sound signal, and
      a first output connector connected to the first video cable and the audio cable;
   a second signal transmission device comprising:
      a second video cable configured to transmit a third image signal transmitted by the second method, and
      a second output connector connected to the second video cable;
   a receiver comprising a first input terminal to which the first output connector is configured to be connected, and a second input terminal to which the second output connector is configured to be connected; and
   a controller configured to:
      determine an image output mode based on whether the first output connector is connected to the first input terminal and whether the second output connector is connected to the second input terminal,
      in response to determining that the first input terminal is connected to the first output connector and the second input terminal is not connected to the second output connector, determine the image output mode as a first mode to output a composite image by processing a composite signal, and
      in response to determining that the first input terminal is connected to the first output connector and the second input terminal is connected to the second output connector, determine the image output mode as a second mode to output a component image by processing a plurality of component signals.

2. The display apparatus of claim 1, wherein the first image signal is a composite signal and the second image signal is a component signal among the plurality of component signals.

3. The display apparatus of claim 2, wherein the controller is further configured to, in response to the first input terminal not being connected to the first output connector and the second input terminal being connected to the second output connector, determine the image output mode as a third mode.

4. The display apparatus of claim 2, wherein the controller is further configured to convert the image output mode automatically according to the determined image output mode.

5. The display apparatus of claim 1 further comprising:
   a body; and
   a display provided in a front surface of the body, wherein the first input terminal and the second input terminal are disposed in a rear surface of the body.

6. The display apparatus of claim 5, wherein the first output connector is configured to be inserted into the first input terminal in a direction parallel to a plane surface of the display, and the second output connector is configured to be inserted into the second input terminal in a direction parallel to the plane surface of the display.

7. The display apparatus of claim 5, wherein the display is configured to, in response to the second output connector being connected to the second input terminal and the first output connector not being connected to the first input terminal, display a screen to guide a connection between the first output connector and the first input terminal.

8. The display apparatus of claim 2, wherein the first signal transmission device further comprises:
   a first image input connector configured to connect a first external device that outputs a composite signal or a second external device that outputs a component signal to the first video cable, and
   a sound input connector configured to connect the first external device or the second external device to the audio cable, and
   wherein the second signal transmission device further comprises a second image input connector configured to connect the second external device to the second video cable.

9. The display apparatus of claim 8, further comprising a display configured to, in response to the first output connector being connected to the first input terminal and the second output connector not being connected to the second input terminal, display a screen to guide a connection between the first image input connector, the sound input connector, and the first external device.

10. The display apparatus of claim 8, further comprising a display configured to, in response to the first output connector being connected to the first input terminal and the second output connector being connected to the second input terminal, display a screen to guide a connection between the first image input connector, the sound input connector, the second image input connector, and the second external device.

11. The display apparatus of claim 1, wherein the controller is further configured to:
in response to determining the image output mode as the first mode, deactivate the second mode, and
in response to determining the image output mode as the second mode, deactivate the first mode.

12. A display apparatus comprising:
a first signal transmission device comprising:
a first video cable configured to selectively transmit a first component signal among a plurality of component signals and a composite signal,
an audio cable configured to transmit a sound signal,
a first output connector connected to the first video cable and the audio cable, and
a first input connector connected to a first external device that outputs a composite signal or a second external device that outputs the plurality of component signals via an external cable;
a second signal transmission device comprising:
a second video cable configured to transmit a second component signal among the plurality of component signals;
a third video cable configured to transmit a third component signal among the plurality of component signals;
a second output connector connected to the second video cable and the third video cable, and
a second input connector connected to a second external device that outputs the plurality of component signals via an external cable;
a receiver comprising a first input terminal to which the first output connector is configured to be connected, and a second input terminal to which the second output connector is configured to be connected; and
a controller configured to:
in response to determining that the first input terminal is connected to the first output connector and the second input terminal is not connected to the second output connector, determine an image output mode as a first mode to output a composite image by processing the composite signal, and
in response to determining that the first input terminal is connected to the first output connector and the second input terminal is connected to the second output connector, determine the image output mode as a second mode to output a component image by processing the plurality of component signals.

13. The display apparatus of claim 12, wherein the first input connector comprises a first image input connector connected to the first video cable and a sound input connector connected to the audio cable, and the second input connector comprises a second image input connector connected to the second video cable and a third image input connector connected to the third video cable, wherein the first image input connector, the sound input connector, the second image input connector, and the third image input connector are female connectors.

14. The display apparatus of claim 12, wherein the first video cable has a different length than the audio cable and the second video cable has a different length than the third video cable.

15. The display apparatus of claim 12, wherein the controller is further configured to:
in response to determining the image output mode as the first mode, deactivate the second mode, and
in response to determining the image output mode as the second mode, deactivate the first mode.

16. A control method of a display apparatus comprising:
determining whether a first signal transmission device is connected to a first input terminal, wherein the first signal transmission device comprises a first video cable for selectively transmitting a first component signal among a plurality of component signals and a composite signal, an audio cable for transmitting a sound signal, and a first output connector connected to the first video cable and the audio cable;
determining whether a second signal transmission device is connected to a second input terminal, wherein the second signal transmission device comprises a second video cable for transmitting a second component signal among the plurality of component signals, a third video cable for transmitting a third component signal among the plurality of component signals, and a second output connector connected to the second video cable and the third video cable; and
determining an image output mode based on whether there is a connection between the first output connector and the first input terminal and whether there is a connection between the second output connector and the second input terminal,
wherein the determining the image output mode comprises:
in response to the first input terminal being connected to the first signal transmission device and the second input terminal not being connected to the second signal transmission device, determining the image output mode as a first mode outputting a composite image by processing the composite signal, and
in response to the first input terminal being connected to the first signal transmission device and the second input terminal being connected to the second signal transmission device, determining the image output mode as a second mode outputting a component image by processing the plurality of component signals.

17. The control method of claim 16, wherein the determining the image output mode comprises, in response to the first input terminal not being connected to the first signal transmission device and the second input terminal being connected to the second signal transmission device, determining the image output mode as a third mode.

18. The control method of claim 16 further comprising:
converting the image output mode automatically according to the determined image output mode.

19. The method of claim 16, further comprising:
in response to determining the image output mode as the first mode, deactivating the second mode, and
in response to determining the image output mode as the second mode, deactivating the first mode.

* * * * *